(12) United States Patent
Damnjanovic et al.

(10) Patent No.: US 9,497,747 B2
(45) Date of Patent: Nov. 15, 2016

(54) DATA TRANSMISSION IN CARRIER AGGREGATION WITH DIFFERENT CARRIER CONFIGURATIONS

(71) Applicant: QUALCOMM Incorporated, San Diego, CA (US)

(72) Inventors: Jelena Damnjanovic, Del Mar, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 13/924,522

(22) Filed: Jun. 21, 2013

(65) Prior Publication Data

US 2013/0343239 A1 Dec. 26, 2013

Related U.S. Application Data

(60) Provisional application No. 61/663,468, filed on Jun. 22, 2012.

(51) Int. Cl.
*H04J 3/00* (2006.01)
*H04W 72/04* (2009.01)
*H04L 5/00* (2006.01)
(Continued)

(52) U.S. Cl.
CPC ............ *H04W 72/042* (2013.01); *H04L 5/001* (2013.01); *H04L 5/1469* (2013.01); *H04W 72/1289* (2013.01); *H04L 5/0053* (2013.01); *H04L 5/0055* (2013.01)

(58) Field of Classification Search
CPC .................................................. H04L 5/0055
USPC ........................................................ 370/329
See application file for complete search history.

(56) References Cited

U.S. PATENT DOCUMENTS

2011/0205973 A1    8/2011   Ogawa et al.
2011/0205976 A1    8/2011   Roessel et al.
2011/0280164 A1   11/2011   Luo et al.
(Continued)

OTHER PUBLICATIONS

Ericsson et al., "On the mapping of CIF to component carriers", 3GPP Draft; R1-100842, 3rd Generation Partnership Project (3GPP), Mobile Competence Centre ; 650, Route Des Lucioles; F-06921 Sophia-Antipolis Cedex ; France, vol. RAN WG1, no. San Francisco, USA; Feb. 22, 2010, Feb. 16, 2010, XP050418457, [retrieved on Feb. 16, 2010] pp. 2, 3 figures 1-3.
(Continued)

*Primary Examiner* — Mark Rinehart
*Assistant Examiner* — Matthew Hopkins
(74) *Attorney, Agent, or Firm* — Harrity & Harrity, LLP

(57) ABSTRACT

Techniques are provided for aggregating carriers with different carrier configurations. The carriers may include both time division duplex (TDD) and frequency division duplex (FDD) carriers which may be configured such that control information for both carrier types is conveyed by the TDD carrier. In one aspect, an association between a set of subframes, including both TDD and FDD subframes, is determined. The association may operate to distribute control information for the FDD carrier over uplink subframes of the TDD carrier to achieve a load balancing. Alternatively, the association may operate to minimize a hybrid automatic repeat request (HARQ) feedback delay. The TDD carrier may provide resource grants for the aggregated carriers and the association may be used to identify subframes from both carriers which may be scheduled in a given DL subframe.

37 Claims, 23 Drawing Sheets

(51) Int. Cl.
*H04L 5/14* (2006.01)
*H04W 72/12* (2009.01)

(56) References Cited

U.S. PATENT DOCUMENTS

| | | | |
|---|---|---|---|
| 2012/0106404 A1 | 5/2012 | Damnjanovic | |
| 2012/0257552 A1 | 10/2012 | Chen et al. | |
| 2012/0322455 A1 | 12/2012 | Oh | |
| 2013/0024816 A1 | 1/2013 | Bender | |
| 2013/0039327 A1 | 2/2013 | Gao et al. | |
| 2013/0208634 A1* | 8/2013 | Ji | H04W 72/0406 370/280 |
| 2013/0242816 A1* | 9/2013 | He | H04W 52/0235 370/280 |
| 2013/0308550 A1* | 11/2013 | Yin | H04L 5/001 370/329 |
| 2014/0092789 A1* | 4/2014 | Lei | H04J 3/1694 370/280 |

OTHER PUBLICATIONS

Mediatek Inc: "Discussion on Rel-10 LTE Feature List and UE Capability from RAN1 Perspective", 3GPP Draft; R1-110145 REL-10 Features V1.0, 3rd Generation Partnership Project (3GPP), Mobile Competence Centr, 57-59 650, Route Des Lucioles; F-06921 Sophia-Antipolis Cedex ; France, vol. RAN WG1, no. Dublin, Ireland; Jan. 17, 2011, Jan. 12, 2011 XP050490318, [retrieved on Jan. 12, 2011] pp. 2, 3; table 2.

Partial International Search Report—PCT/US2013/047203—ISA/EPO—Sep. 25, 2013.

International Search Report and Written Opinion—PCT/US2013/047203—ISA/EPO—Feb. 5, 2014.

* cited by examiner

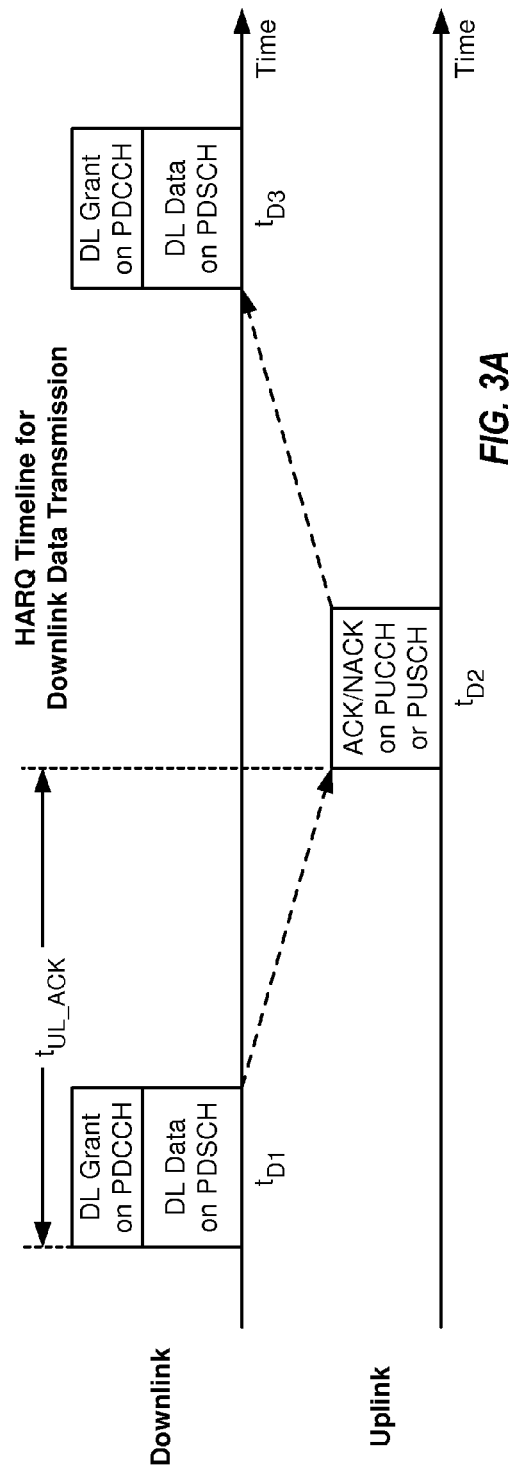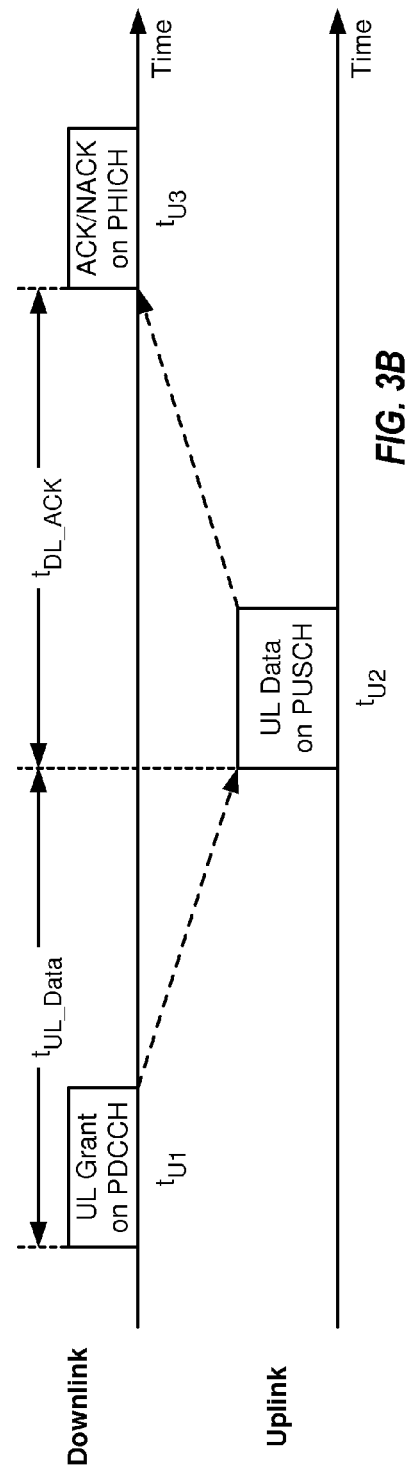

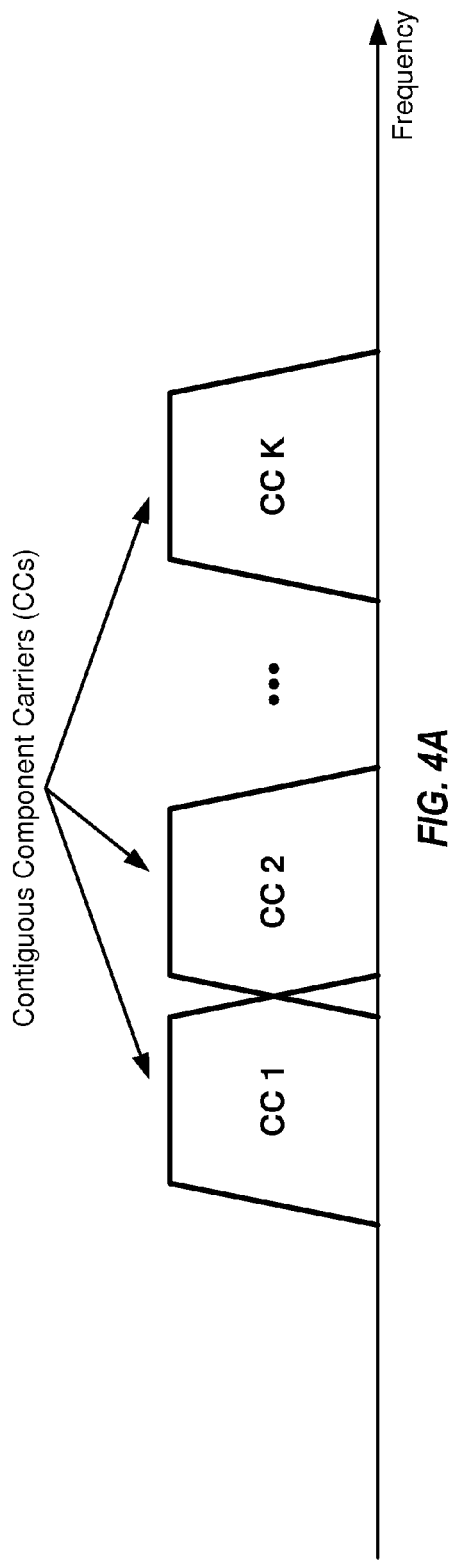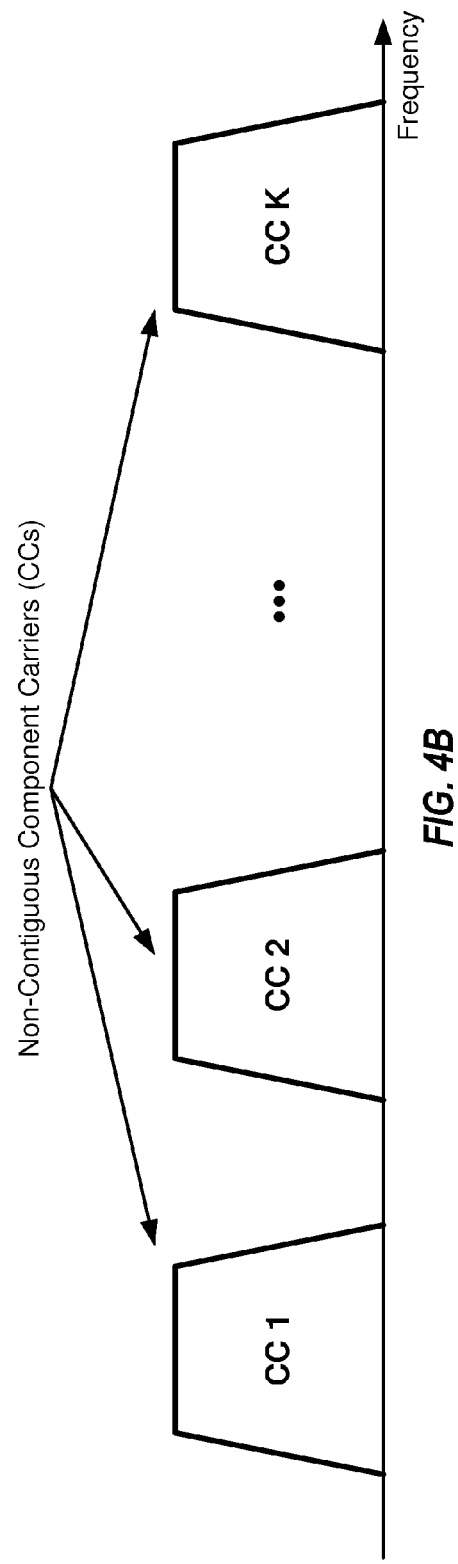
FIG. 4A
FIG. 4B

DATA TRANSMISSION IN CARRIER AGGREGATION WITH DIFFERENT CARRIER CONFIGURATIONS

CROSS-REFERENCE TO RELATED APPLICATION

The present Application for Patent claims priority to Provisional Application No. 61/663,468, filed Jun. 22, 2012, entitled "DATA TRANSMISSION IN CARRIER AGGREGATION WITH DIFFERENT CARRIER CONFIGURATIONS", which is assigned to the assignee hereof, and is expressly incorporated in its entirety by reference herein.

BACKGROUND

I. Field

The present disclosure relates generally to communication, and more specifically to techniques for supporting carrier aggregation in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc. A base station may send data and control information on one or more carriers to a UE. The UE may send control information to support data transmission by the base station. In this context there remains a need for flexible transmission and processing of control information for carrier aggregation.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Techniques are provided for aggregating carriers with different carrier configurations. The carriers may include both time division duplex (TDD) and frequency division duplex (FDD) carriers which may be configured such that control information for both carrier types is conveyed by the TDD carrier. In one aspect, an association between a set of subframes, including both TDD and FDD subframes, is determined. The association may operate to distribute control information for the FDD carrier over uplink subframes of the TDD carrier to achieve a load balancing. Alternatively, the association may operate to minimize a hybrid automatic repeat request (HARQ) feedback delay. The TDD carrier may provide resource grants for the aggregated carriers and the association may be used to identify subframes from both carriers which may be scheduled in a given DL subframe.

According to one aspect, a method for sending control information may include determining an association between a set of downlink (DL) subframes including TDD subframes and FDD subframes of the respective first and second component carriers and an uplink (UL) subframe of the first component carrier based on an uplink-downlink configuration of the first component carrier. The method may include generating control information associated with transmissions on the set of DL subframes. The method may include sending the control information on the UL subframe of the first component carrier based on the association, wherein each DL subframe of the FDD second component carrier is associated with a corresponding UL subframe of the first component carrier.

According to another aspect, a mobile device may be configured for carrier aggregation (CA) of at least a TDD first component carrier and a FDD second component carrier. The mobile device may include means for determining an association between a set of DL subframes including TDD subframes and FDD subframes of the respective first and second component carriers and a UL subframe of the first component carrier based on an uplink-downlink configuration of the first component carrier. The mobile device may include means for generating control information associated with transmissions on the set of DL subframes. The mobile device may include means for sending the control information on the UL subframe of the first component carrier based on the association, wherein each DL subframe of the FDD second component carrier is associated with a corresponding UL subframe of the first component carrier.

According to another aspect, a mobile device may be configured for CA of at least a TDD first component carrier and a FDD second component carrier. The mobile device may include at least one processor configured to determine an association between a set of DL subframes including TDD subframes and FDD subframes of the respective first and second component carriers and an UL subframe of the first component carrier based on an uplink-downlink configuration of the first component carrier. The mobile device may include the at least one processor configured to generate control information associated with transmissions on the set of DL subframes. The mobile device may include a transceiver configured to send the control information on the UL subframe of the first component carrier based on the association, wherein each DL subframe of the FDD second component carrier is associated with a corresponding UL subframe of the first component carrier. The mobile device may include a memory coupled to the at least one processor for storing data.

According to another aspect, a computer program product may include a computer-readable storage medium including code for causing at least one computer to receive a resource grant in a DL subframe of the first component carrier. The computer-readable storage medium may include code for causing the at least one computer to determine an association between the DL subframe and a set of subframes including TDD subframes and FDD subframes of the respective first and second component carriers based on an uplink-downlink configuration of the first component carrier. The computer-readable storage medium may include code for causing the at least one computer to send the control information on the UL subframe of the first component carrier based on the association, wherein each DL subframe of the FDD second component carrier is associated with a corresponding UL subframe of the first component carrier.

According to yet another aspect, a method of wireless communication by a mobile device may be configured for CA of at least a TDD first component carrier and a FDD second component carrier. The method may include receiving a resource grant in a DL subframe of the first component carrier. The method may include determining an association between the DL subframe and a set of subframes including TDD subframes and FDD subframes of the respective first and second component carriers based on an uplink-downlink configuration of the first component carrier. The method may include identifying, based on the association, a subframe in the set of subframes for transmitting or receiving data on in response to the resource grant, wherein each subframe of the FDD second component carrier is associated with a DL subframe of the first component carrier.

According to another aspect, a mobile device may be configured for CA of at least a TDD first component carrier and a FDD second component carrier. The mobile device may include means for receiving a resource grant in a DL subframe of the first component carrier. The mobile device may include means for determining an association between the DL subframe and a set of subframes including TDD subframes and FDD subframes of the respective first and second component carriers based on an uplink-downlink configuration of the first component carrier. The mobile device may include means for identifying, based on the association, a subframe in the set of subframes for transmitting or receiving data on in response to the resource grant, wherein each subframe of the FDD second component carrier is associated with a corresponding DL subframe of the first component carrier.

According to another aspect, a mobile device may be configured for CA of at least a TDD first component carrier and a FDD second component carrier. The mobile device may include a transceiver configured to receive a resource grant in a DL subframe of the first component carrier. The mobile device may include at least one processor configured to determine an association between the DL subframe and a set of subframes including TDD subframes and FDD subframes of the respective first and second component carriers based on an uplink-downlink configuration of the first component carrier. The mobile device may include the at least one processor configured to identify, based on the association, a subframe in the set of subframes for transmitting or receiving data on in response to the resource grant, wherein each subframe of the FDD second component carrier is associated with a DL subframe of the first component carrier. The mobile device may include a memory coupled to the at least one processor for storing data.

According to another aspect, a computer program product may include a computer-readable storage medium including code for causing at least one computer to receive a resource grant in a DL subframe of the first component carrier. The computer-readable storage medium may include code for causing the at least one computer to determine an association between the DL subframe and a set of subframes including TDD subframes and FDD subframes of the respective first and second component carriers based on an uplink-downlink configuration of the first component carrier. The computer-readable storage medium may include code for causing the at least one computer to identify, based on the association, a subframe in the set of subframes for transmitting or receiving data on in response to the resource grant, wherein each subframe of the FDD second component carrier is associated with a DL subframe of the first component carrier.

According to yet another aspect, a method is disclosed for wireless communication by an access node supporting CA of at least a TDD first component carrier and a FDD second component carrier for a mobile device. The method may include receiving, from the mobile device on an UL subframe, control information associated with transmissions on a set of DL subframes including TDD subframes and FDD subframes of the respective first and second component carriers. The method may include determining an association between the set of DL subframes and the UL subframe based on an uplink-downlink configuration of the first component carrier. The method may include decoding, by the access node, the control information in accordance with the association, wherein each DL subframe of the FDD second component carrier is associated with an UL subframe of the first component carrier.

According to another aspect, an access node may be configured for CA of at least a TDD first component carrier and a FDD second component carrier. The access node may include means for receiving, from the mobile device on an UL subframe, control information associated with transmissions on a set of DL subframes including TDD subframes and FDD subframes of the respective first and second component carriers. The access node may include means for determining an association between the set of DL subframes and the UL subframe based on an uplink-downlink configuration of the first component carrier. The access node may include means for decoding, by the access node, the control information in accordance with the association, wherein each DL subframe of the FDD second component carrier is associated with an UL subframe of the first component carrier.

According to another aspect, an access node may be configured for CA of at least a TDD first component carrier and a FDD second component carrier. The access node may include a transceiver configured to receive, from the mobile device on an UL subframe, control information associated with transmissions on a set of DL subframes including TDD subframes and FDD subframes of the respective first and second component carriers. The access node may include at least one processor configured to determine an association between the set of DL subframes and the UL subframe based on an uplink-downlink configuration of the first component carrier. The access node may include the at least one processor further configured to decode, by the access node, the control information in accordance with the association, wherein each DL subframe of the FDD second component carrier is associated with an UL subframe of the first component carrier. The access node may include a memory coupled to the at least one processor for storing data.

According to another aspect, a computer program product may include a computer-readable storage medium including code for causing at least one computer to receive, from a mobile device on an UL subframe, control information associated with transmissions on a set of DL subframes including TDD subframes and FDD subframes of the respective first and second component carriers. The computer-readable storage medium may include code for causing the at least one computer to determine an association between the set of DL subframes and the UL subframe based on an uplink-downlink configuration of the first component carrier. The computer-readable storage medium may include code for causing the at least one computer to decode the control information in accordance with the association, wherein each DL subframe of the FDD second component carrier is associated with an UL subframe of the first component carrier.

According to yet another aspect, a method is disclosed for wireless communication by an access node supporting CA of at least a TDD first component carrier and a FDD second component carrier for a mobile device. The method may include determining an association between a DL subframe of the first component carrier and a set of subframes including TDD subframes and FDD subframes of the respective first and second component carriers based on an uplink-downlink configuration of the first component carrier. The method may include sending a resource grant to the mobile device in the DL subframe, wherein the resource grant schedules transmission or reception of data by the mobile device with respect to a subframe in the set of subframes based on the association, and wherein each subframe of the FDD second component carrier is associated with a DL subframe of the first component carrier.

According to another aspect, an access node may be configured for CA of at least a TDD first component carrier and a FDD second component carrier. The access node may include means for determining an association between a DL subframe of the first component carrier and a set of subframes including TDD subframes and FDD subframes of the respective first and second component carriers based on an uplink-downlink configuration of the first component carrier. The access node may include means for sending a resource grant to the mobile device in the DL subframe, wherein the resource grant schedules transmission or reception of data by the mobile device with respect to a subframe in the set of subframes based on the association, and wherein each subframe of the FDD second component carrier is associated with a DL subframe of the first component carrier.

According to another aspect, an access node may be configured for CA of at least a TDD first component carrier and a FDD second component carrier. The access node may include at least one processor configured to determine an association between a DL subframe of the first component carrier and a set of subframes including TDD subframes and FDD subframes of the respective first and second component carriers based on an uplink-downlink configuration of the first component carrier. The access node may include at least one processor configured to send a resource grant to the mobile device in the DL subframe, wherein the resource grant schedules transmission or reception of data by the mobile device with respect to a subframe in the set of subframes based on the association, and wherein each subframe of the FDD second component carrier is associated with a DL subframe of the first component carrier.

According to another aspect, a computer program product may include a computer-readable storage medium including code for causing at least one computer to determine an association between a DL subframe of the first component carrier and a set of subframes including TDD subframes and FDD subframes of the respective first and second component carriers based on an uplink-downlink configuration of the first component carrier. The computer-readable storage medium may include code for causing the at least one computer to send a resource grant to the mobile device in the DL subframe, wherein the resource grant schedules transmission or reception of data by the mobile device with respect to a subframe in the set of subframes based on the association, and wherein each subframe of the FDD second component carrier is associated with a DL subframe of the first component carrier.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIG. 1 shows a wireless communication network, which may be an LTE network or the like.

FIG. 3A shows an example of data transmission on the downlink with hybrid automatic repeat request (HARQ).

FIG. 3B shows an example of data transmission on the uplink with HARQ.

FIG. 4A shows an example of contiguous carrier aggregation.

FIG. 4B shows an example of non-contiguous carrier aggregation.

DETAILED DESCRIPTION

Techniques for supporting data transmission in a wireless communication network with carrier aggregation are disclosed herein. These techniques may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
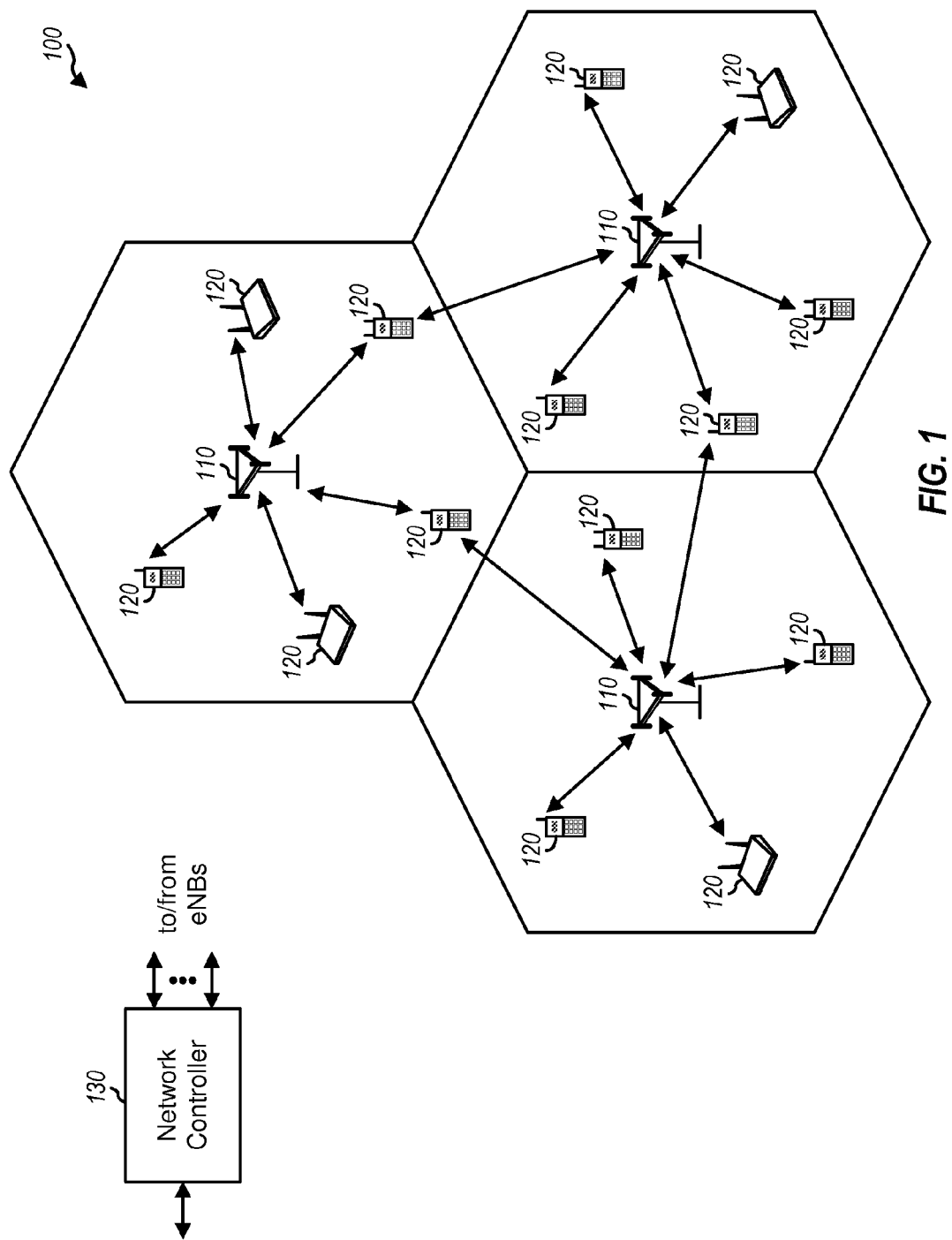

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In general, an eNB may support one or multiple (e.g., three) cells. The term "cell" may also refer to a carrier on which an eNB operates.

Wireless network 100 may also include relays. A relay may be an entity that receives a transmission of data from an upstream entity (e.g., an eNB or a UE) and sends a transmission of the data to a downstream entity (e.g., a UE or an eNB). A relay may also be a UE that relays transmissions for other UEs.

A network controller 130 may couple to a set of eNBs and may provide coordination and control for these eNBs. Network controller 130 may communicate with the eNBs via a backhaul. The eNBs may also communicate with one another via the backhaul.

UEs 120 may be dispersed throughout the wireless network, and each UE may be stationary or mobile. A UE may also be referred to as a mobile station, a terminal, an access terminal, a subscriber unit, a station, a node, etc. A UE may be a cellular phone, a smartphone, a tablet, a personal digital assistant (PDA), a wireless modem, a wireless communication device, a handheld device, a laptop computer, a cordless phone, a wireless local loop (WLL) station, a netbook, a smartbook, etc. A UE may be able to communicate with eNBs, relays, other UEs, etc.

Wireless network 100 may utilize FDD and/or TDD. For FDD, the downlink and uplink may be allocated separate frequency channels. Downlink transmissions may be sent on one frequency channel, and uplink transmissions may be sent on another frequency channel. For TDD, the downlink and uplink may share the same frequency channel, and downlink transmissions and uplink transmissions may be sent on the same frequency channel in different time periods.

Figure 2A:
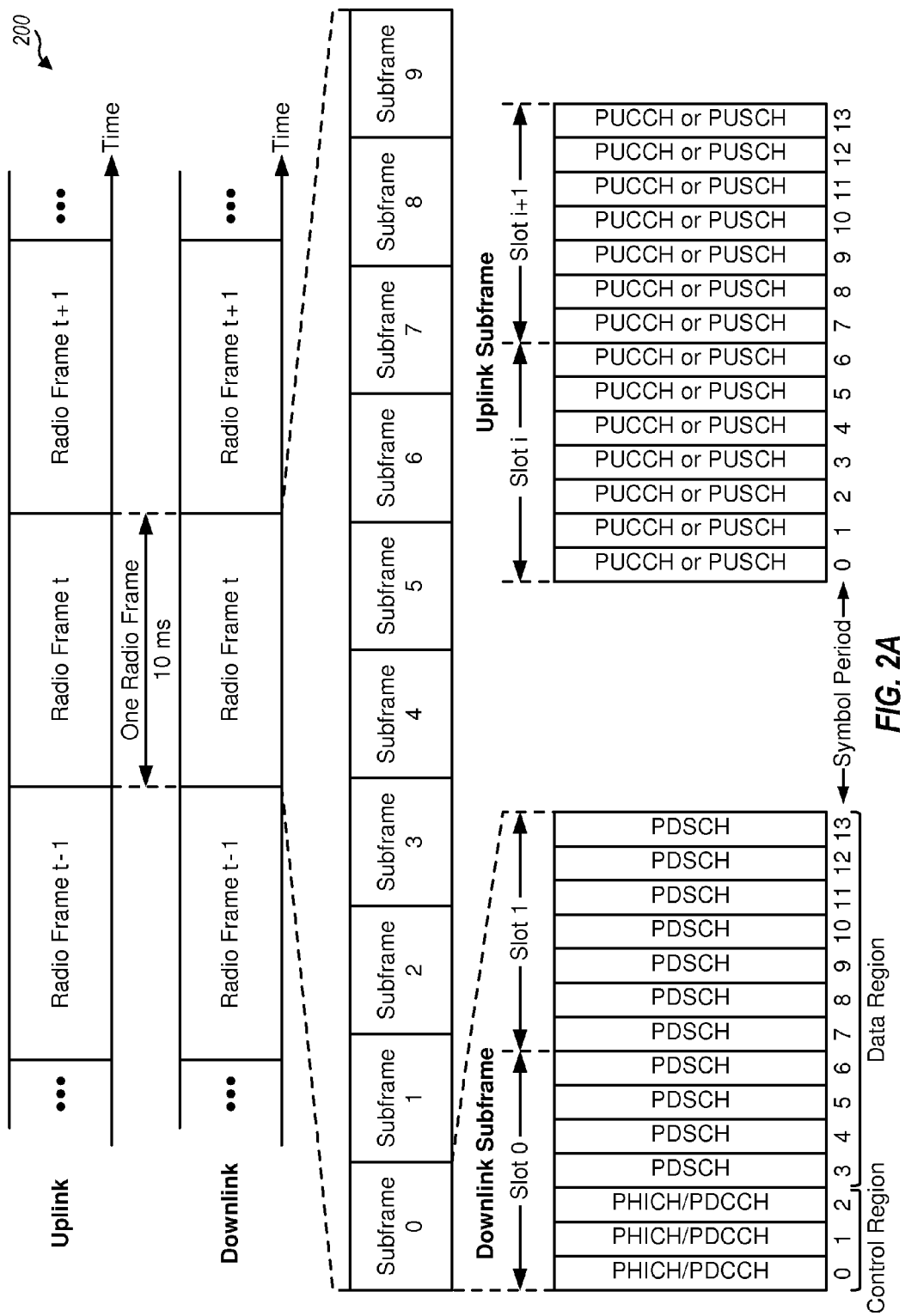
FIG. 2A shows an exemplary frame structure for a frequency division duplex (FDD) carrier in an LTE communication system.

FIG. 2A shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2A) or six symbol periods for an extended cyclic prefix. The 2L symbol periods in each subframe may be assigned indices of 0 through 2L−1. For FDD, each subframe for the frequency channel used for the downlink may be referred to as a downlink subframe. Each subframe for the frequency channel used for the uplink may be referred to as an uplink subframe.

A downlink subframe may include a control region and a data region. The control region may include the first Q symbol periods of the downlink subframe, where Q may be equal to 1, 2, 3 or 4 and may change from subframe to subframe. The data region may include the remaining symbol periods of the downlink subframe.

Figure 2B:
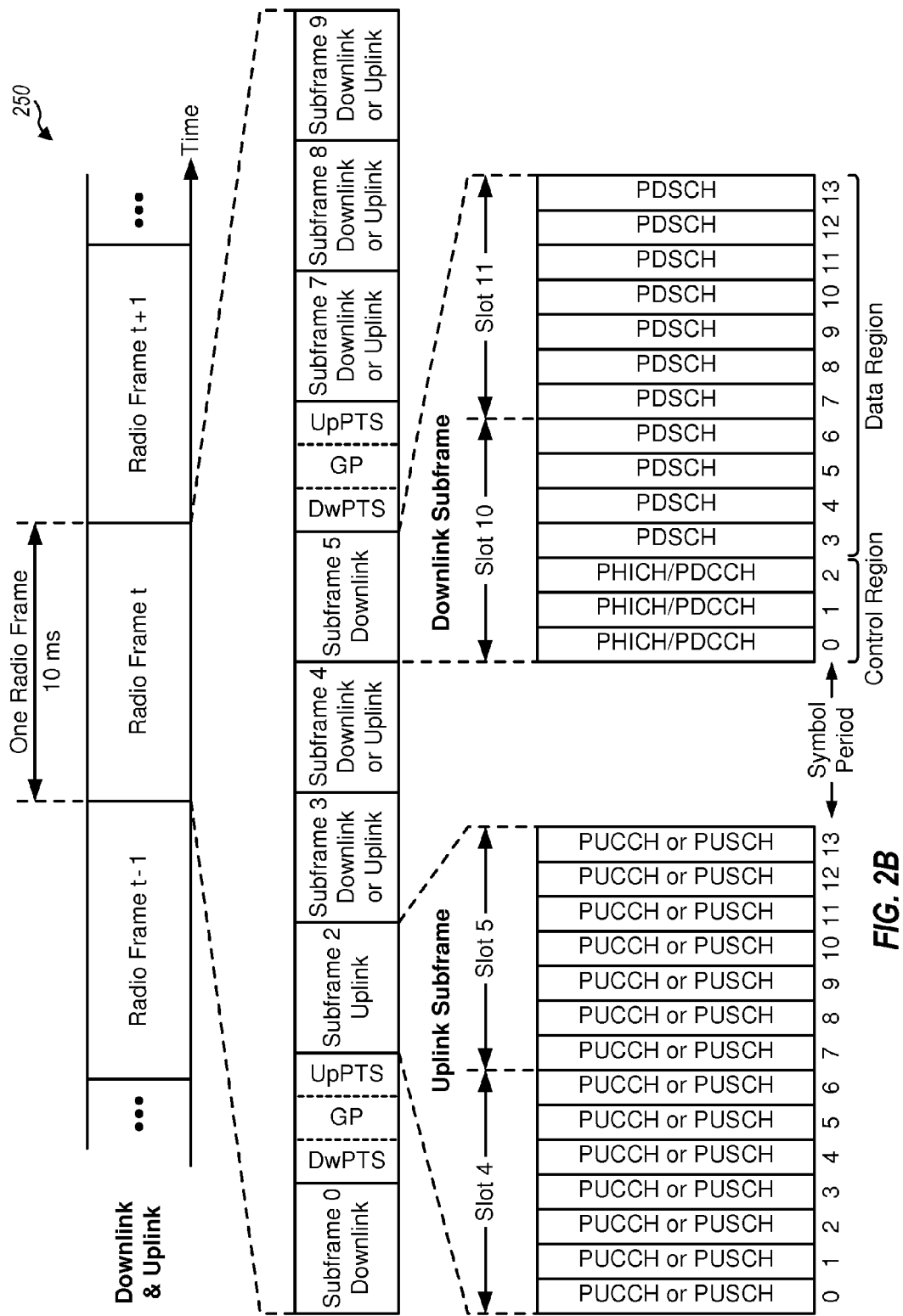
FIG. 2B shows an exemplary frame structure for a time division duplex (TDD) carrier in an LTE communication system.

FIG. 2B shows an exemplary frame structure 250 for TDD in LTE. The transmission timeline for the downlink and uplink may be partitioned into units of radio frames, and each radio frame may be partitioned into 10 subframes with indices of 0 through 9. LTE supports a number of uplink-downlink configurations for TDD. Subframes 0 and 5 are used for the downlink and subframe 2 is used for the uplink for all uplink-downlink configurations. Subframes 3, 4, 7, 8 and 9 may each be used for the downlink or uplink depending on the uplink-downlink configuration. Subframe 1 includes three special fields composed of a Downlink Pilot Time Slot (DwPTS) used for downlink control channels as well as data transmission, a Guard Period (GP) of no transmission, and an Uplink Pilot Time Slot (UpPTS) used for either a random access channel (RACH) or sounding reference signals (SRS). Subframe 6 may include only the DwPTS, or all three special fields, or a downlink subframe depending on the uplink-downlink configuration. The DwPTS, GP and UpPTS may have different durations for different subframe configurations. For TDD, each subframe used for the downlink may be referred to as a downlink subframe, and each subframe used for the uplink may be referred to as an uplink subframe.

Table 1 lists seven exemplary uplink-downlink configurations available in an LTE network supporting TDD operation. Each uplink-downlink configuration indicates whether each subframe is a downlink subframe (denoted as "D" in Table 1), or an uplink subframe (denoted as "U" in Table 1), or a special subframe (denoted as "S" in Table 1). As shown in Table 1, uplink-downlink configurations 1 through 5 have more downlink subframes than uplink subframes in each radio frame.

TABLE 1

Uplink-Downlink Configurations for TDD

| Uplink-Downlink Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

For both FDD and TDD, a cell may transmit a Physical Downlink Control Channel (PDCCH), a Physical HARQ Indicator Channel (PHICH), and/or other physical channels in the control region of a downlink subframe. The PDCCH may carry downlink control information (DCI) such as downlink grants, uplink grants, etc. The PHICH may carry acknowledgement/negative acknowledgement (ACK/NAK) feedback for data transmission sent by UEs on the uplink with hybrid automatic retransmission (HARQ). The cell may also transmit a Physical Downlink Shared Channel (PDSCH) and/or other physical channels in the data region of a downlink subframe. The PDSCH may carry data for UEs scheduled for data transmission on the downlink and/or other information.

For both FDD and TDD, a UE may transmit either a Physical Uplink Control Channel (PUCCH) in a control region of an uplink subframe or a Physical Uplink Shared Channel (PUSCH) in a data region of the uplink subframe. The PUCCH may carry uplink control information (UCI) such as channel state information (CSI), ACK/NAK feedback for data transmission sent to the UE on the downlink with HARQ, scheduling request, etc. The PUSCH may carry data and/or UCI.

The various channels in LTE are described in 3GPP TS 36.211, entitled "Evolved Universal Terrestrial Radio Access (E-UTRA); Physical Channels and Modulation," which is publicly available.

Wireless network 100 may support data transmission with HARQ in order to improve reliability. For HARQ, a transmitter (e.g., an eNB) may send an initial transmission of a transport block and may send one or more additional transmissions of the transport block, if needed, until the transport block is decoded correctly by a receiver (e.g., a UE), or the maximum number of transmissions of the transport block has occurred, or some other termination condition is encountered. A transport block may also be referred to as a packet, a codeword, etc. After each transmission of the transport block, the receiver may decode all received transmissions of the transport block to attempt to recover the transport block. The receiver may send an ACK if the transport block is decoded correctly or a NAK if the transport block is decoded in error. The transmitter may send another transmission of the transport block if a NAK is received and may terminate transmission of the transport block if an ACK is received.

LTE supports synchronous HARQ on the uplink and asynchronous HARQ on the downlink. For synchronous HARQ, all transmissions of a transport block may be sent in subframes of a single HARQ interlace, which may include evenly spaced subframes. For asynchronous HARQ, each transmission of a transport block may be sent in any subframe.

A specific HARQ timeline may be used for data transmission with HARQ. The HARQ timeline may indicate a specific subframe in which a grant is sent on the PDCCH, a specific subframe in which data transmission is sent on the PDSCH or the PUSCH based on the grant, and a specific subframe in which ACK/NAK for the data transmission is sent on the PUCCH or the PHICH. In general, an HARQ timeline may specify transmission of control information (e.g., grants, ACK/NAK, etc.), data, and/or other information in a particular sequence and/or at specific times. An HARQ timeline may or may not support retransmission of data. An HARQ timeline may also be referred to as a scheduling timeline, a data transmission timeline, a control timeline, etc.

FIG. 3A shows an example of data transmission on the downlink with HARQ. An eNB may schedule a UE for data transmission on the downlink. The eNB may send a downlink (DL) grant on the PDCCH and a data transmission of one or more transport blocks on the PDSCH to the UE in subframe $t_{D1}$. The UE may receive the downlink grant and may process (e.g., demodulate and decode) the data transmission received on the PDSCH based on the downlink grant. The UE may determine ACK/NAK feedback based on whether each transport block is decoded correctly or in error. The UE may send the ACK/NAK feedback on the PUCCH or PUSCH to the eNB in subframe $t_{D2}$. The eNB may receive the ACK/NAK feedback from the UE. The eNB may terminate transmission of each transport block for which an ACK is received and may send another transmission of each transport block for which a NAK is received.

FIG. 3B shows an example of data transmission on the uplink with HARQ. An eNB may schedule a UE for data transmission on the uplink. The eNB may send an uplink (UL) grant on the PDCCH to the UE in subframe $t_{U1}$. The UE may receive the uplink grant and may send a data transmission of one or more transport blocks on the PUSCH in subframe $t_{U2}$. The eNB may process (e.g., demodulate and decode) the data transmission received on the PUSCH based on the uplink grant. The eNB may determine ACK/NAK feedback based on whether each transport block is decoded correctly or in error. The eNB may send the ACK/NAK feedback on the PHICH to the UE in subframe $t_{U3}$. The eNB may schedule the UE for data transmission of each transport block decoded in error by the eNB (not shown in FIG. 3B).

As shown in FIGS. 3A and 3B, different HARQ timelines may be used for data transmission on the downlink and uplink. An HARQ timeline used for data transmission on the downlink may be referred to as a downlink HARQ timeline. An HARQ timeline used for data transmission on the uplink may be referred to as an uplink HARQ timeline. As shown in FIG. 3A, the downlink HARQ timeline may indicate (i)

a specific downlink subframe $t_{Dx}$ in which to send a data transmission on the downlink for a downlink grant sent in a given downlink subframe $t_{D1}$ and (ii) a specific uplink subframe $t_{D2}$ in which to send ACK/NAK feedback on the uplink for the data transmission in downlink subframe $t_{Dx}$, where $t_{Dx}=t_{D1}$ when the downlink grant and the downlink data transmission are sent on the same carrier as shown in FIG. 3A. As shown in FIG. 3B, the uplink HARQ timeline may indicate (i) a specific uplink subframe $t_{U2}$ in which to send a data transmission on the uplink for an uplink grant sent in a given downlink subframe $t_{U1}$ and (ii) a specific downlink subframe $t_{U3}$ in which to send ACK/NAK feedback on the downlink for the data transmission in uplink subframe $t_{U2}$.

Different HARQ timelines may be used for FDD and TDD. Furthermore, different HARQ timelines may be used for different uplink-downlink configurations for TDD and also for different subframes of a given uplink-downlink configuration.

As shown in FIG. 3A, the downlink HARQ timeline may indicate that for a downlink grant sent in downlink subframe $t_{D1}$, data transmission may be sent in the same downlink subframe, and ACK/NAK feedback may be sent $n_{UL\_ACK}$ subframes later in uplink subframe $t_{D2}=t_{D1}+n_{UL\_ACK}$. In LTE, $n_{UL\_ACK}=4$ for FDD, and $n_{UL\_ACK}\geq 4$ for TDD.

As shown in FIG. 3B, the uplink HARQ timeline may indicate that for an uplink grant sent in downlink subframe $t_{U1}$, data transmission may be sent $n_{UL\_Data}$ subframes later in uplink subframe $t_{U2}=t_{U1}+n_{UL\_Data}$, and ACK/NAK feedback may be sent $n_{DL\_ACK}$ subframes later in downlink subframe $t_{U3}=t_{U2}+n_{DL\_ACK}$. In LTE, $n_{UL\_Data}=4$ and $n_{DL\_ACK}=4$ for FDD, and $n_{UL\_Data}\geq 4$ and $n_{DL\_ACK}\geq 4$ for TDD.

For FDD, $n_{UL\_ACK}$, $n_{UL\_Data}$ and $n_{DL\_ACK}$ may each be equal to four. For TDD, $n_{UL\_ACK}$, $n_{UL\_Data}$, and $n_{DL\_ACK}$ may be different for different uplink-downlink configurations and also for different subframes of a given uplink-downlink configuration, as described below.

Table 2 lists the value of $n_{UL\_ACK}$ for different uplink subframes $t_{D2}$ in which ACK/NAK may be sent on the PUCCH or PUSCH for the seven uplink-downlink configurations shown in Table 1. $n_{UL\_ACK}$ may be a subframe offset value. For example, for uplink-downlink (UL-DL) configuration 1, subframe 3, the value of 4 may indicate association with a subframe that is 4 subframes prior (i.e., subframe 9 of the previous radio frame). As an example, for UL-DL configuration 1, ACK/NAK may be sent on the PUCCH or PUSCH (i) in uplink subframe 2 to support data transmission on the PDSCH in downlink subframe 5 or 6 of the previous radio frame or (ii) in uplink subframe 3 to support data transmission on the PDSCH in downlink subframe 9 of the previous radio frame.

TABLE 2

$n_{UL\_ACK}$ for Downlink HARQ Timeline

| Uplink-Downlink Configuration | Downlink Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 6, 7 | 4 | | | | 6, 7 | 4 | |
| 2 | | | 4, 6, 7, 8 | | | | | 4, 6, 7, 8 | | |
| 3 | | | 6, 7, 11 | 5, 6 | 4, 5 | | | | | |
| 4 | | | 7, 8, 11, 12 | 4, 5, 6, 7 | | | | | | |
| 5 | | | 4, 5, 6, 7, 8, 9, 11, 12, 13 | | | | | | | |
| 6 | | | 7 | 7 | 5 | | | 7 | 7 | |

Table 3 lists the value of $n_{UL\_Data}$ for different downlink subframes $t_{U1}$ in which uplink grants may be sent on the PDCCH for the seven UL-DL configurations shown in Table 1. As an example, for UL-DL configuration 1, an uplink grant may be sent on the PDCCH (i) in downlink subframe 1 to support data transmission on the PUSCH in uplink subframe 7 or (ii) in downlink subframe 4 to support data transmission on the PUSCH in uplink subframe 8. For UL-DL configurations 1 through 5, more downlink subframes are available to send DCI than uplink subframes available to send data. Hence, some downlink subframes are not utilized to send DCI.

TABLE 3

$n_{UL\_Data}$ for Uplink HARQ Timeline

| Uplink-Downlink Configuration | Downlink Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | | 4 | 6 | | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Table 4 lists the value of $n_{DL\_ACK}$ for different downlink subframes $t_{U3}$ in which ACK/NAK may be sent on the PHICH for the seven UL-DL configurations shown in Table 1. As an example, for UL-DL configuration 1, ACK/NAK may be sent on the PHICH (i) in downlink subframe 1 to support data transmission on the PUSCH in uplink subframe 7 of the previous radio frame or (ii) in downlink subframe 4 to support data transmission on the PUSCH in uplink subframe 8 of the previous radio frame. A subframe in which ACK/NAK can be sent on the PHICH may be referred to as a PHICH subframe, a non-zero PHICH subframe, etc. The PHICH subframes are those with non-zero $n_{DL\_ACK}$ values in Table 4.

TABLE 4

$n_{DL\_ACK}$ for Uplink HARQ Timeline

| Uplink-Downlink Configuration | Downlink Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

Wireless network 100 may support operation on multiple component carriers (CCs), which may be referred to as carrier aggregation or multi-carrier operation. A UE may be configured with multiple CCs for the downlink and one or more CCs for the uplink for carrier aggregation. For FDD, a CC may comprise one frequency channel for the downlink and another frequency channel for the uplink. For TDD, a CC may comprise a single frequency channel used for both the downlink and uplink. A CC configured for FDD may be referred to as an FDD CC. A CC configured for TDD may be referred to as a TDD CC. An eNB may transmit data and control information on one or more CCs to a UE. The UE may transmit data and control information on one or more CCs to the eNB.

FIG. 4A shows an example of contiguous carrier aggregation. K CCs may be available and may be adjacent to each other, where in general K may be any integer value. K may be limited to 5 or less in some LTE Releases. Each CC may have a bandwidth of up to 20 MHz. The overall system bandwidth may be up to 100 MHz when five CCs are supported. FIG. 4B shows an example of non-contiguous carrier aggregation. K CCs may be available and may be separate from each other. Each CC may have a bandwidth of up to 20 MHz.

In LTE Release 10, a UE may be configured with up to five CCs for carrier aggregation. Each CC may have a bandwidth of up to 20 MHz and may be backward compatible with LTE Release 8. The UE may thus be configured with up to 100 MHz for up to five CCs. In one design, one CC may be designated as a primary CC (PCC) for the downlink and may be referred to as a downlink PCC. The downlink PCC may carry certain DCI such as downlink grants, uplink grants, ACK/NAK feedback, etc. In one design, one CC may be designated as a primary CC for the uplink and may be referred to as an uplink PCC. The uplink PCC may carry certain UCI such as ACK/NAK feedback, etc. In one design, the downlink PCC may be the same as the uplink PCC, and both may be referred to as a PCC. In another design, the downlink PCC may be different from the uplink PCC.

For carrier aggregation, a UE may support operation on one PCC and one or more secondary CCs (SCCs) on the downlink. The UE may also support operation on one PCC and zero or more SCCs on the uplink. An SCC is a CC that is not a PCC.

Each CC may be associated with a particular CC configuration. A CC configuration of a CC may indicate a particular duplexing mode of the CC (e.g., FDD or TDD) and, if TDD, a particular UL-DL configuration of the CC. LTE Release 10 supports carrier aggregation for multiple CCs with the same CC configuration. In particular, all CCs for carrier aggregation are configured for either FDD or TDD, and a mixture of FDD and TDD CCs is not allowed. Furthermore, if the CCs are configured for TDD, then all CCs have the same UL-DL configuration, although special subframes may be configured separately for different CCs. Restricting all CCs to have the same FDD or TDD configuration as well as the same UL-DL configuration may simplify operation.

LTE Release 11 and/or later may support carrier aggregation for multiple CCs with different CC configurations. For example, an aggregation of FDD and TDD CCs may be supported. As another example, an aggregation of CCs with different UL-DL configurations for TDD may be supported. The different UL-DL configurations for different CCs may be due to various reasons such as (i) different UL-DL configurations for TDD, e.g., as shown in Table 1, (ii) partitioning of downlink subframes and uplink subframes to support operation of relays, (iii) allocation of downlink subframes and uplink subframes to support home eNBs, pico eNBs, etc., and/or (iv) other reasons. Supporting CCs with different UL-DL configurations may provide more flexibility in deployment. Each CC may be backward compatible with a single CC in LTE Release 8, 9 or 10 in a single-carrier mode.

Figure 5:
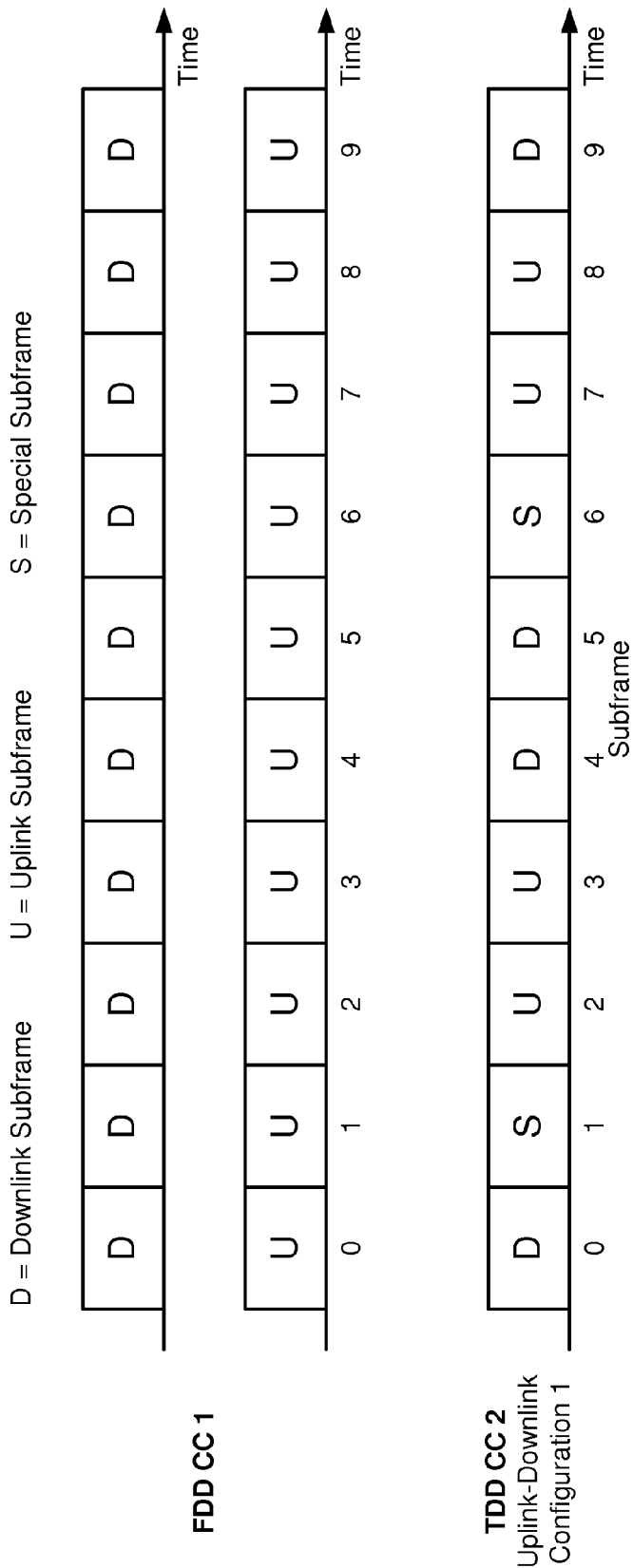
FIG. 5 shows an exemplary deployment of two component carriers (CCs) with different carrier configurations.

FIG. 5 shows an exemplary deployment of two CCs with different CC configurations. In this example, CC 1 is configured for FDD and includes two frequency channels. One frequency channel is for the downlink and includes downlink subframes, which are denoted as "D" in FIG. 5. The other frequency channel is for the uplink and includes uplink subframes, which are denoted as "U" in FIG. 5. CC 2 is configured for TDD with UL-DL configuration 1. Subframes 0, 4, 5 and 9 of CC 2 are downlink subframes, subframes 1 and 6 of CC 2 are special subframes, and remaining subframes 2, 3, 7 and 8 of CC 2 are uplink subframes.

There may be challenges in aggregating multiple CCs with different CC configurations. These CCs may be associated with different numbers of downlink and uplink subframes. Furthermore, a given subframe t may correspond to a downlink subframe on one CC and an uplink subframe on another CC. Hence, downlink subframes of one or more CCs may overlap with uplink subframes of one or more other CCs. In general, CCs with different CC configurations may be associated with different sets of downlink subframes and uplink subframes. This may complicate transmission of control information to support data transmission with HARQ.

Carrier aggregation for multiple CCs with different CC configurations may be supported with same-carrier control and/or cross-carrier control. For same-carrier control, control information may be sent on a given CC to support data transmission on the same CC. For cross-carrier control, control information may be sent on one CC to support data transmission on another CC. For both same-carrier control and cross-carrier control, a UE may send control information on the PUCCH on the PCC when not scheduled for data transmission on the uplink.

Carrier aggregation for multiple CCs with different CC configurations may also be supported with cross-subframe control. For cross-subframe control, control information may be sent in a given subframe and may be applicable for multiple subframes. For example, multiple grants may be sent in a given downlink subframe to schedule data transmission in multiple downlink subframes and/or multiple uplink subframes. Cross-subframe control may be especially applicable when a CC used to send grants includes more uplink subframes than downlink subframes.

Table 5 lists two scenarios for carrier aggregation of multiple CCs with different CC configurations. In the first scenario, an FDD CC is a PCC, a TDD CC is an SCC, and the FDD CC controls the TDD CC, e.g., schedules data transmission on the TDD CC. In the second scenario, a TDD CC is a PCC, an FDD CC is an SCC, and the TDD CC controls the FDD CC, e.g., schedules data transmission on the FDD CC. For both scenarios, a scheduling CC is a CC controlling another CC, and a scheduled CC is a CC that is controlled by another CC.

TABLE 5

| Scenario | PCC | SCC | Description |
| --- | --- | --- | --- |
| First scenario | FDD CC | TDD CC | FDD CC controls TDD CC FDD CC is scheduling CC, and TDD CC is scheduled CC |
| Second scenario | TDD CC | FDD CC | TDD CC controls FDD CC TDD CC is scheduling CC, and FDD CC is scheduled CC |

For cross-carrier control, data transmission may be supported based on an HARQ timeline of a scheduling CC and/or an HARQ timeline of a scheduled CC. For simplicity, an HARQ timeline of an FDD CC may be referred to as an FDD timeline, and an HARQ timeline of a TDD CC may be referred to as a TDD timeline. The HARQ timeline for cross-carrier control may be based on one or more of the following:

1. Use HARQ timeline of scheduled CC:
   i) First scenario—use TDD timeline of an UL-DL configuration of TDD CC when TDD CC is scheduled by FDD CC, or
   ii) Second scenario—use FDD timeline when FDD CC is scheduled by TDD CC.
2. Use HARQ timeline of scheduling CC:
   i) First scenario—use FDD timeline when TDD CC is scheduled by FDD CC, or
   ii) Second scenario—use TDD timeline of an UL-DL configuration of TDD CC when FDD CC is scheduled by TDD CC.
3. Use hybrid timeline:
   i) Second scenario—use TDD timeline of an UL-DL configuration of TDD CC when FDD CC is scheduled by TDD CC, use FDD timeline for feedback sent on the uplink on FDD CC.

Figure 6A:
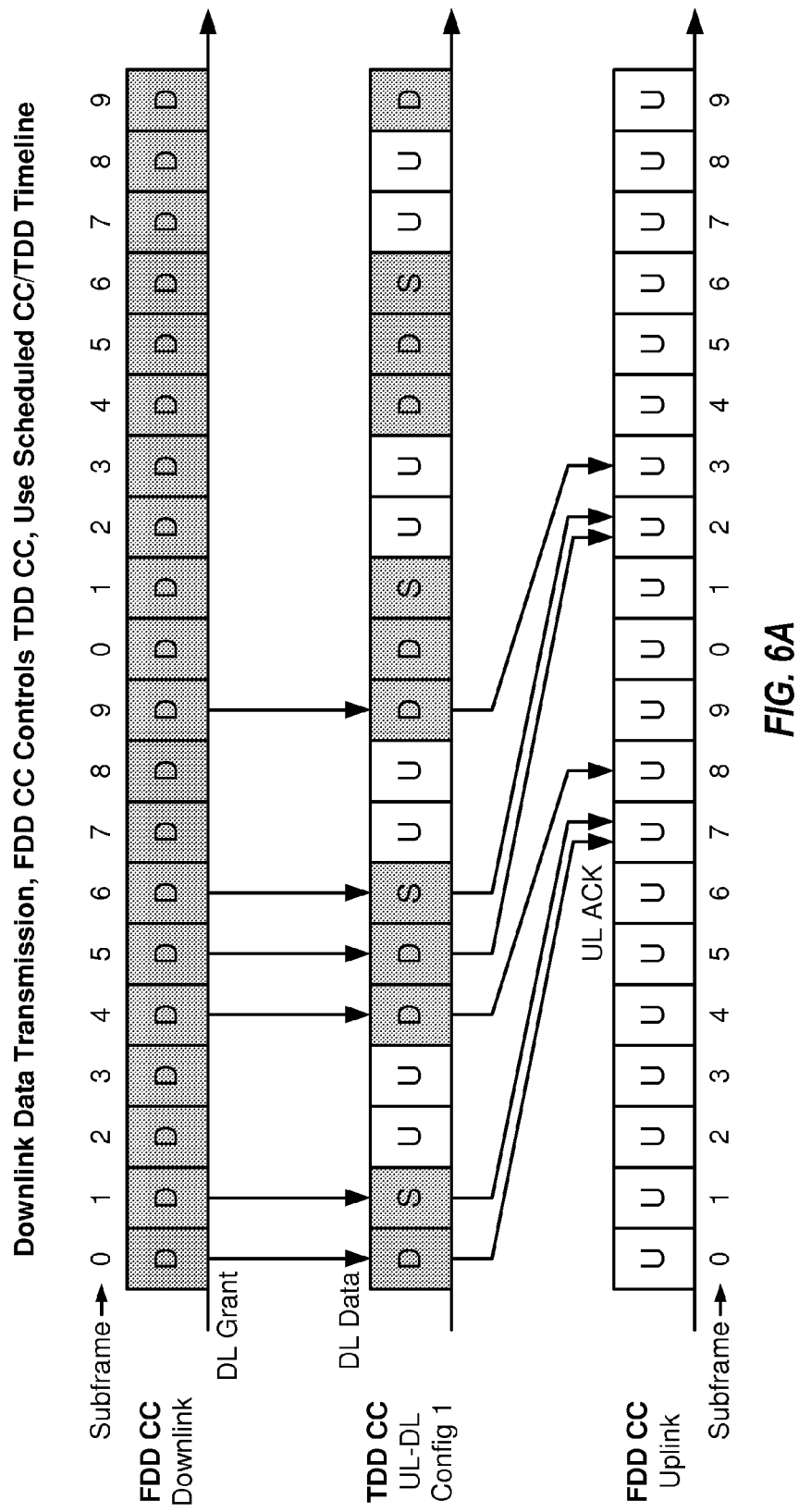
FIG. 6A shows an example of data transmission on the downlink in a first scenario with an FDD CC controlling a TDD CC using the TDD timeline of the scheduled CC.

FIG. 6A shows an example of data transmission on the downlink in the first scenario with an FDD CC controlling a TDD CC using the TDD timeline of the scheduled CC. In this case, control information is sent on the FDD CC, and downlink data is sent on the TDD CC. FIG. 6A shows an example in which the TDD CC has UL-DL configuration 1, and data may be sent on the TDD CC in only downlink subframes 0, 1, 4, 5, 6 and 9. Downlink grants may be sent on the FDD CC in downlink subframes 0, 1, 4, 5, 6 and 9 for downlink data transmission on the TDD CC in downlink subframes 0, 1, 4, 5, 6 and 9, respectively. ACK/NAK feedback may be sent on the FDD CC in uplink subframes 7, 7, 8, 2, 2 and 3 for data transmission on the TDD CC in downlink subframes 0, 1, 4, 5, 6 and 9, respectively.

Figure 6B:
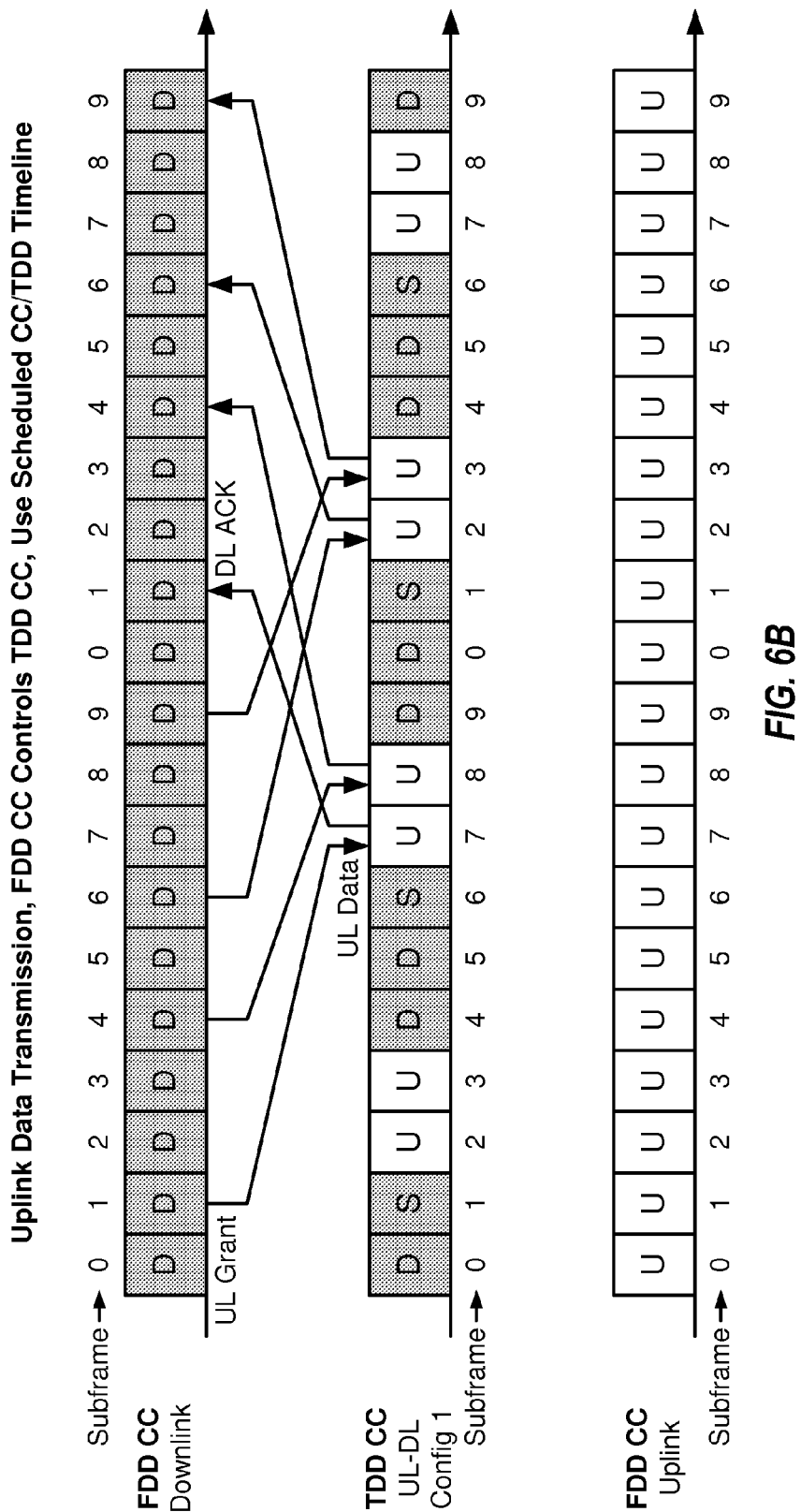
FIG. 6B shows an example of data transmission on the uplink in a first scenario with an FDD CC controlling a TDD CC using the TDD timeline of the scheduled CC.

FIG. 6B shows an example of data transmission on the uplink in the first scenario with an FDD CC controlling a TDD CC using the TDD timeline of the scheduled CC. In this case, control information is sent on the FDD CC, and uplink data is sent on the TDD CC. FIG. 6B shows an example in which the TDD CC has UL-DL configuration 1, and data may be sent on the TDD CC in only uplink subframes 2, 3, 7 and 8. Uplink grants may be sent on the FDD CC in downlink subframes 1, 4, 6 and 9 for uplink data transmission on the TDD CC in uplink subframes 7, 8, 2 and 3, respectively. ACK/NAK feedback may be sent on the FDD CC in downlink subframes 1, 4, 6 and 9 for data transmission on the TDD CC in uplink subframes 7, 8, 2 and 3, respectively.

As shown in FIGS. 6A and 6B, when the FDD CC controls the TDD CC using the TDD timeline, only applicable subframes of the FDD CC (as determined by the HARQ timeline of the TDD CC) may be used to send control information on the FDD CC. In particular, uplink and downlink grants may be sent on the PDCCH and ACK/NAK feedback may be sent on the PHICH in downlink subframes of the FDD CC determined based on the HARQ timeline of the TDD CC. CSI and ACK/NAK feedback may be sent on the PUCCH in uplink subframes of the FDD CC (which may be the PCC) determined based on the HARQ timeline of the TDD CC. DCI may be sent on the FDD CC based on DCI formats for TDD.

For uplink data transmission shown in FIG. 6B, PHICH collisions may occur, e.g., due to ACK/NAK feedback for data transmission in multiple uplink subframes being mapped to the same downlink subframe of the FDD CC. This may occur due to a given subframe of different CCs being scheduled in different subframes of the FDD CC. For example, a first uplink grant may be sent in downlink subframe 3 of the FDD CC to schedule data transmission in uplink subframe 7 of the FDD CC. A second uplink grant may be sent in downlink subframe 1 of the FDD CC to schedule data transmission in uplink subframe 7 of the TDD CC. The ACK/NAK feedback for data transmission in uplink subframe 7 of both the FDD CC and the TDD CC may be sent on the FDD CC in downlink subframe 1 of the next radio frame. PHICH collisions may be handled in similar manner as in LTE Release 10 carrier aggregation using different demodulation reference signals (DMRS). DMRS used in DCIs in downlink subframe 3 of the FDD CC and downlink subframe 1 of the TDD CC may be coordinated.

Figure 7A:
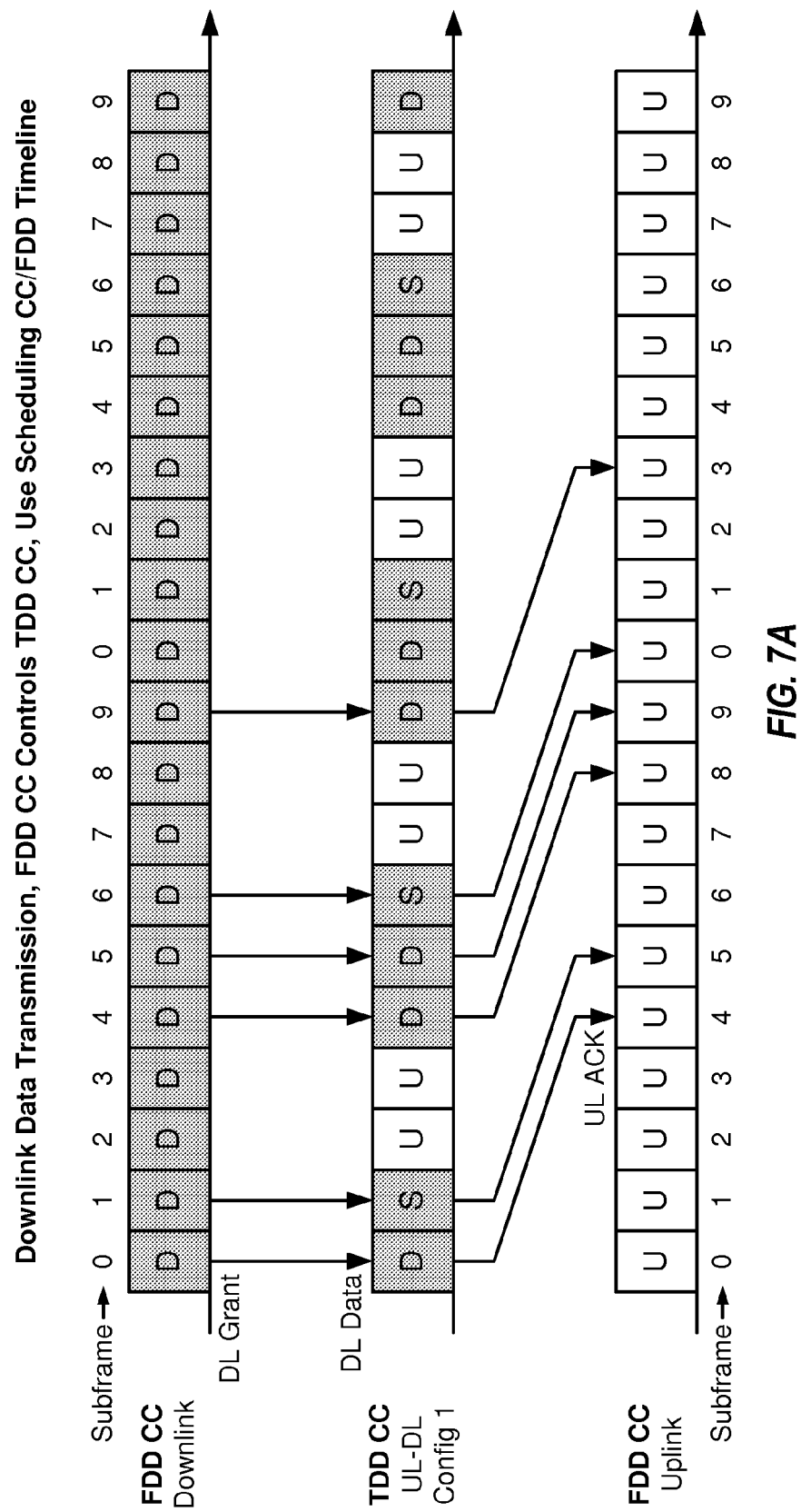
FIG. 7A shows an example of data transmission on the downlink in the first scenario with an FDD CC controlling a TDD CC using the FDD timeline of the scheduling CC.

FIG. 7A shows an example of data transmission on the downlink in the first scenario with an FDD CC controlling a TDD CC using the FDD timeline of the scheduling CC. FIG. 7A shows an example in which the TDD CC has UL-DL configuration 1, and data may be sent on the TDD CC in only downlink subframes 0, 1, 4, 5, 6 and 9. Downlink grants may be sent on the FDD CC in downlink subframes 0, 1, 4, 5, 6 and 9 for downlink data transmission on the TDD CC in downlink subframes 0, 1, 4, 5, 6 and 9, respectively. ACK/NAK feedback may be sent on the FDD CC in uplink subframes 4, 5, 8, 9, 0 and 3 for data transmission on the TDD CC in downlink subframes 0, 1, 4, 5, 6 and 9, respectively.

Figure 7B:
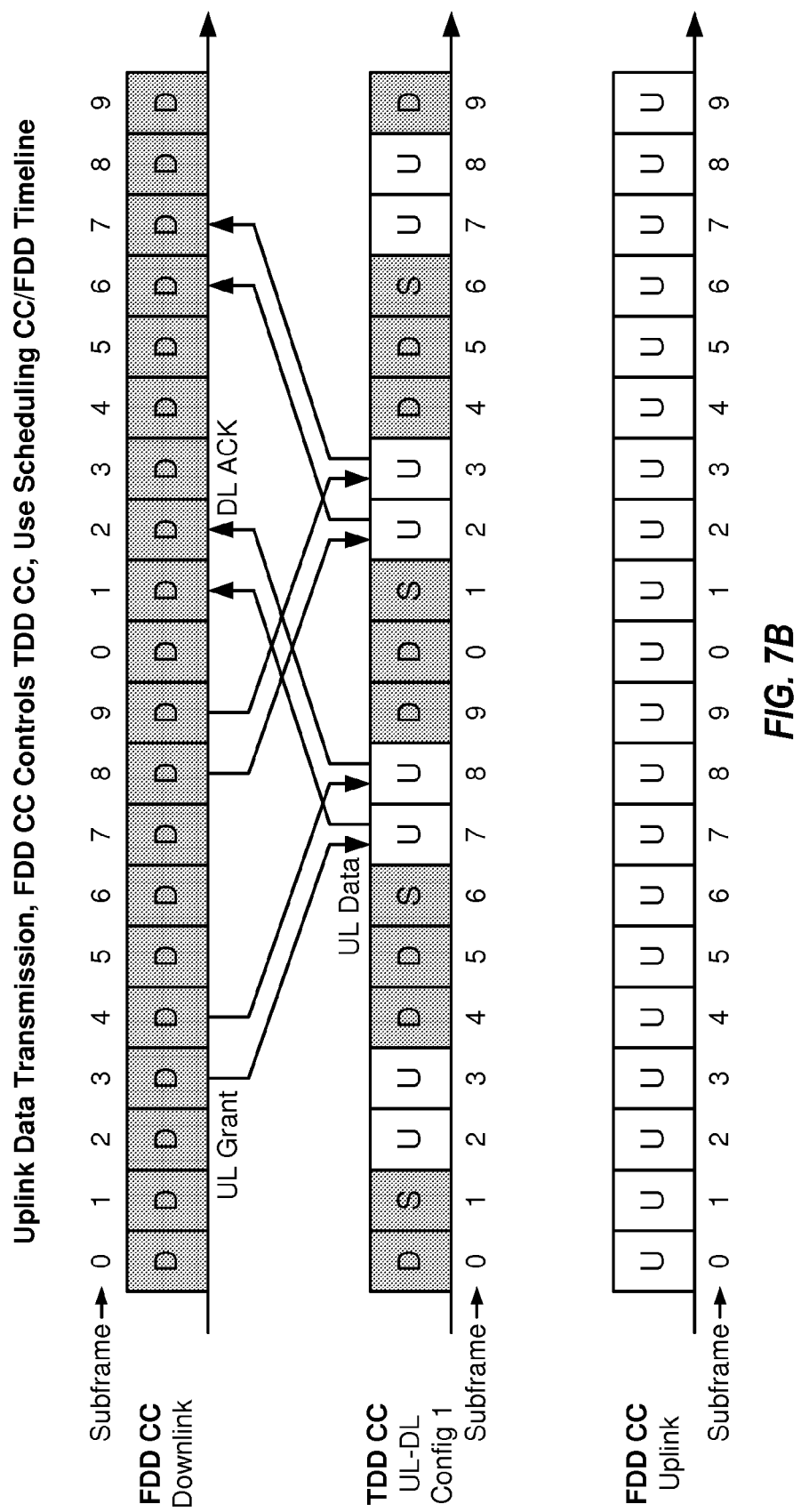
FIG. 7B shows an example of data transmission on the uplink in the first scenario with an FDD CC controlling a TDD CC using the FDD timeline of the scheduling CC.

FIG. 7B shows an example of data transmission on the uplink in the first scenario with an FDD CC controlling a TDD CC using the FDD timeline of the scheduling CC. In this case, control information is sent on the FDD CC, and uplink data is sent on the TDD CC. FIG. 7B shows an example in which the TDD CC has UL-DL configuration 1, and data may be sent on the TDD CC in only uplink subframes 2, 3, 7 and 8 1. Uplink grants may be sent on the FDD CC in downlink subframes 3, 4, 8 and 9 for uplink data transmission on the TDD CC in uplink subframes 7, 8, 2 and 3, respectively. ACK/NAK feedback may be sent on the FDD CC in downlink subframes 1, 2, 6 and 7 for data transmission on the TDD CC in uplink subframes 7, 8, 2 and 3, respectively.

As shown in FIGS. 7A and 7B, when the FDD CC controls the TDD CC using the FDD timeline, only applicable subframes of the FDD CC (as determined by the HARQ timeline of the FDD CC) may be used to send control information on the FDD CC. In particular, uplink and downlink grants may be sent on the PDCCH and ACK/NAK feedback may be sent on the PHICH in downlink subframes of the FDD CC determined based on the HARQ timeline of the FDD CC. CSI and ACK/NAK feedback may be sent on the PUCCH in uplink subframes of the FDD CC (which may be the PCC) determined based on the HARQ timeline of the FDD CC. DCI may be sent on the FDD CC based on DCI formats for FDD. Search spaces for scheduling the FDD CC and TDD CC may be shared if the same carrier bandwidth and transmission mode are used for both CCs. PHICH collisions may occur as described above and may be handled in similar manner as in LTE Release 10 carrier aggregation using different DMRS. PHICH collisions may be readily handled since grants can be sent in the same downlink subframe to schedule data transmission on both the FDD CC and TDD CC.

Using the HARQ timeline of the scheduled/TDD CC in the first scenario (e.g., as shown in FIGS. 6A and 6B) may provide certain advantages. For example, resource allocation management for cross-carrier and same-carrier scheduling of the TDD CC may be easier, and scheduling decisions for both CCs may be done at the same time.

Using the HARQ timeline of the scheduling/FDD CC in the first scenario (e.g., as shown in FIGS. 7A and 7B) may also provide certain advantages. For example, PHICH collision management for the FDD CC controlling the TDD CC may be performed in similar manner as in LTE Release 10. HARQ delay for the TDD CC may be less due to the use of the FDD timeline (instead of the TDD timeline). Throughput loss due to ACK/NAK bundling/multiplexing may be reduced. Search spaces for scheduling both CCs may be shared if the same carrier bandwidth and the same transmission mode are used for both CCs.

In general, when an FDD CC controls a TDD CC in the first scenario, the scheduling FDD CC may follow an FDD timeline or a TDD timeline. There may be less scheduling delay, less HARQ delay, and no throughput loss due to ACK/NAK bundling with cross-carrier control using an FDD timeline versus single-carrier operation on a TDD CC using a TDD timeline. If cross-carrier control is not configured and the FDD timeline is considered for the PUCCH on the uplink, then a UE may (i) follow the TTD timeline for scheduling and ACK/NAK feedback on the PHICH and (ii) use the FDD timeline for feedback on the PUCCH. From a UE complexity perspective, it may be easier to adopt the TDD timeline for the scheduled TDD CC.

For the second scenario, a TDD CC may control an FDD CC. Additional considerations may be needed, regardless of the HARQ timeline selected for use, due to lack of uplink and downlink subframes on the TDD CC as compared to the FDD CC. In one design, only a subset of all downlink and uplink subframes of the FDD CC may be scheduled for data transmission based on the selected HARQ timeline, which may be either the FDD or TDD timeline. In this design, downlink and uplink grants may be sent on the PDCCH, ACK/NAK feedback may be sent on the PHICH, and CSI and ACK/NAK feedback may be sent on the PUCCH on the TDD CC based on the selected HARQ timeline. In one design, remaining downlink and uplink subframes of the FDD CC may be scheduled based on rules not covered by the selected HARQ timeline.

Figure 8A:
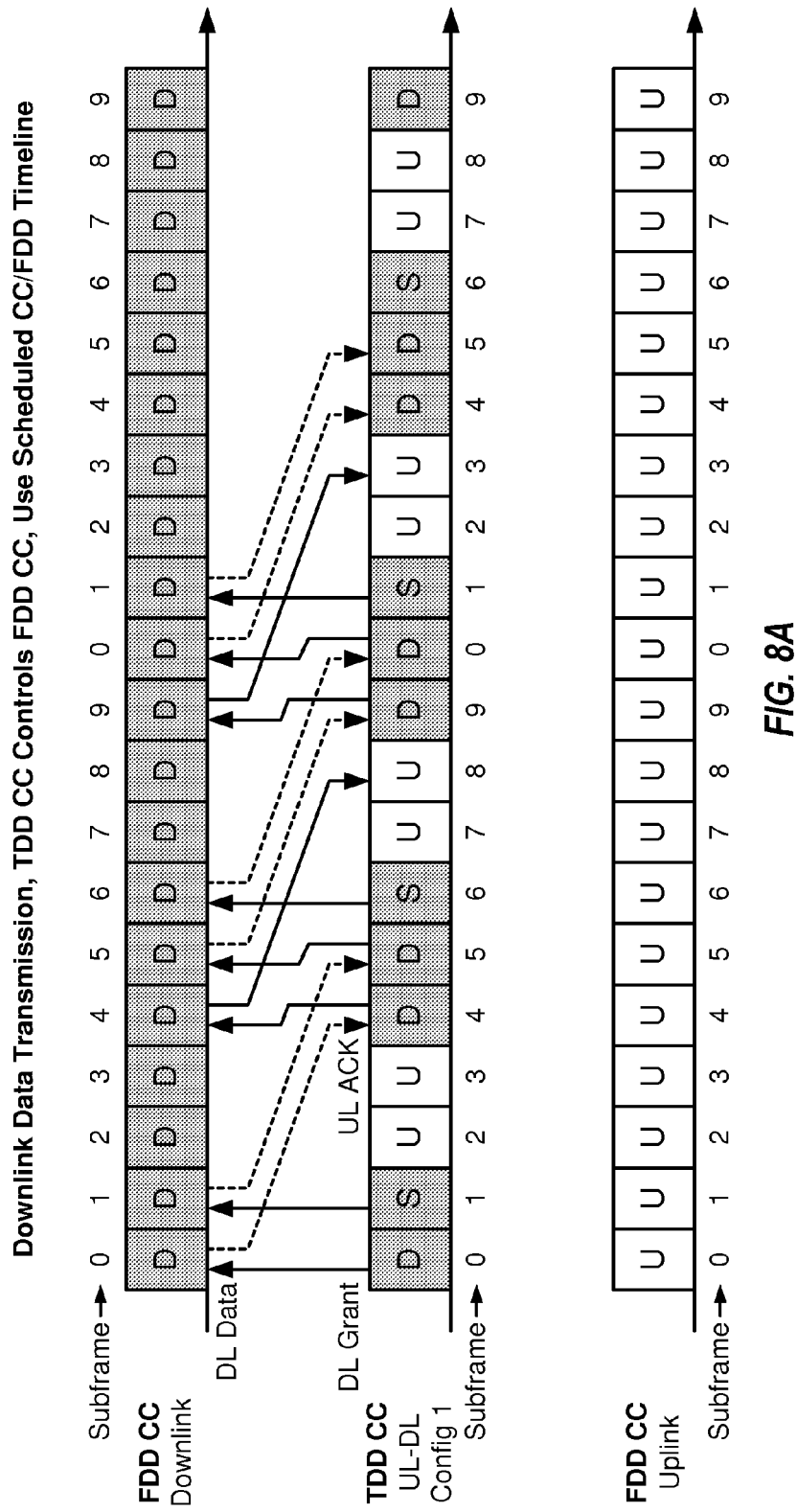
FIG. 8A shows an example of data transmission on the downlink in a second scenario with a TDD CC controlling an FDD CC using the FDD timeline of the scheduled CC.

FIG. 8A shows an example of data transmission on the downlink in the second scenario with a TDD CC controlling an FDD CC using the FDD timeline of the scheduled CC. In this case, control information is sent on the TDD CC, and downlink data is sent on the FDD CC. FIG. 8A shows an example in which the TDD CC has UL-DL configuration 1 and includes the downlink and uplink subframes shown in FIG. 8A. Downlink grants may be sent on the TDD CC in downlink subframes 0, 1, 4, 5, 6 and 9 for downlink data transmission on the FDD CC in downlink subframes 0, 1, 4, 5, 6 and 9, respectively. ACK/NAK feedback would normally be sent on subframes 4, 5, 8, 9, 0 and 3 for data transmission on the FDD CC in downlink subframes 0, 1, 4, 5, 6 and 9, respectively. However, only subframes 8 and 3 of the TDD CC are uplink subframes, and subframes 4, 5, 9 and 0 of the TDD CC are downlink subframes. Hence, ACK/NAK feedback that would normally be sent in subframes 4, 5, 9 and 0 based on the FDD timeline (which are shown by dashed lines with single arrow in FIG. 8A) may be sent in other subframes that are uplink subframes of the TDD CC.

Figure 8B:
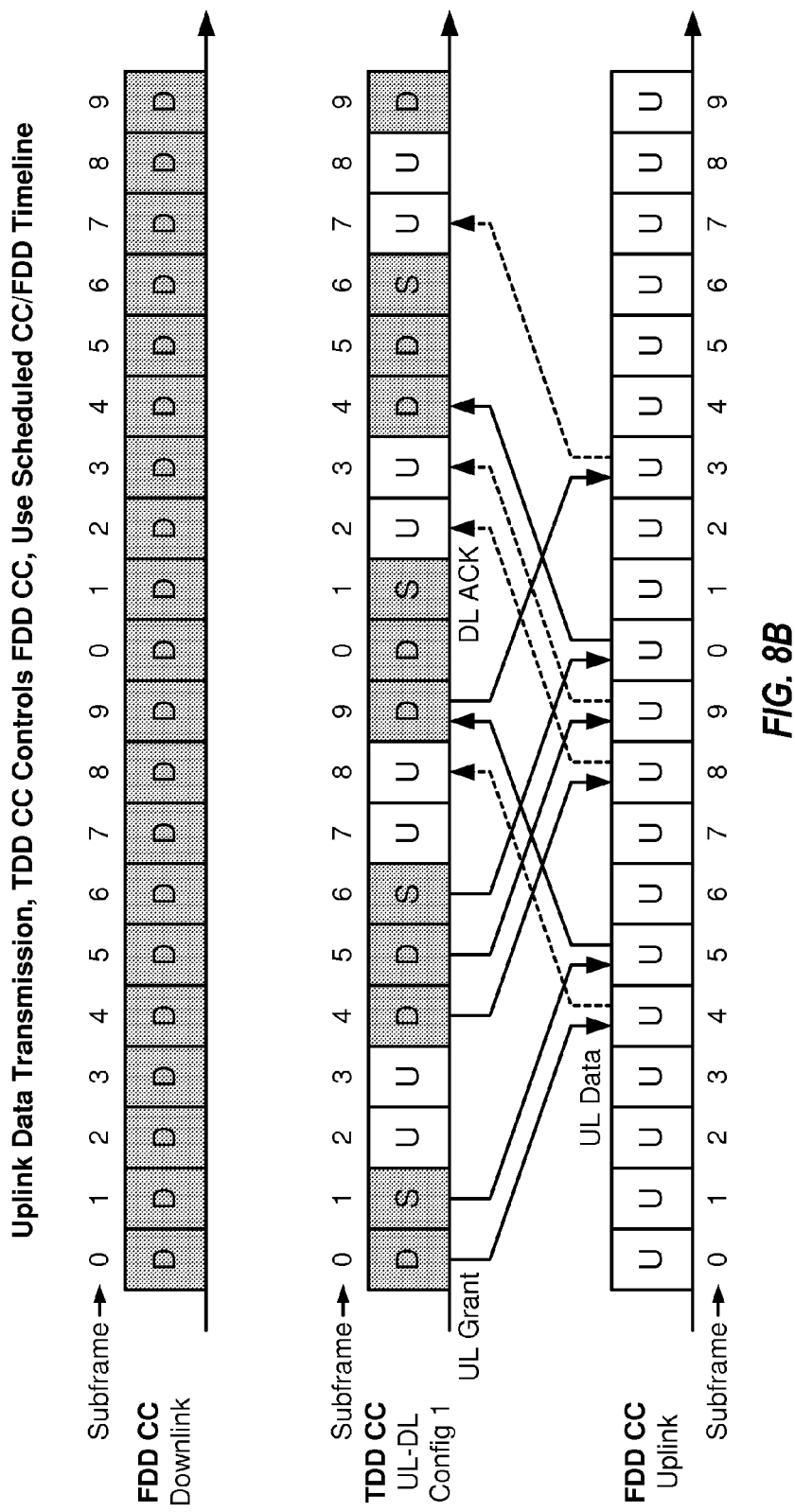
FIG. 8B shows an example of data transmission on the uplink in the second scenario with a TDD CC controlling an FDD CC using the FDD timeline of the scheduled CC.

FIG. 8B shows an example of data transmission on the uplink in the second scenario with a TDD CC controlling an FDD CC using the FDD timeline of the scheduled CC. In this case, control information is sent on the TDD CC, and uplink data is sent on the FDD CC. FIG. 8B shows an example in which the TDD CC has UL-DL configuration 1 and includes the downlink and uplink subframes shown in FIG. 8B. Uplink grants may be sent on the TDD CC in downlink subframes 0, 1, 4, 5, 6 and 9 for uplink data transmission on the FDD CC in uplink subframes 4, 5, 8, 9, 0 and 3, respectively. ACK/NAK feedback would normally be sent on the TDD CC in subframes 8, 9, 2, 3, 4 and 7 for data transmission on the FDD CC in uplink subframes 4, 5, 8, 9, 0 and 3, respectively. However, only subframes 9 and 4 of the TDD CC are downlink subframes, and subframes 8, 2, 3 and 7 of the TDD CC are uplink subframes. Hence, ACK/NAK feedback that would normally be sent in subframes 8, 2, 3 and 7 based on the FDD timeline (which are shown by dashed lines with single arrow in FIG. 8B) may be sent in other subframes that are downlink subframes of the TDD CC.

As shown in FIGS. 8A and 8B, the FDD timeline may be directly applied to a limited number of downlink and uplink subframes of the FDD CC (and not even on all subframes that overlap with the downlink and uplink subframes of the TDD CC). The FDD timeline assumes certain downlink-uplink pair transmissions (e.g., for grants and ACK/NAK feedback) that may not be available among the overlapping subframes. New rules may be defined for downlink and uplink subframes of the FDD CC for which the FDD timeline cannot be directly applied.

In one design, DCI may be sent on the TDD CC based on DCI formats for FDD. DCI for the FDD CC may be sent in a first search space, and DCI for the TDD CC may be sent in a second search space. In one design, the search spaces for the two CCs are not shared if DCI formats for FDD are used even when the two CCs are associated with the same carrier bandwidth and the same transmission mode.

For uplink data transmission, PHICH collisions may occur due to ACK/NAK feedback for the FDD CC and the TDD CC being sent in the same downlink subframe of the TDD CC. PHICH collisions may result from a given uplink subframe of the two CCs being scheduled from different downlink subframes of the TDD CC. PHICH collisions may be handled in similar manner as in LTE Release 10 carrier aggregation using different DMRS.

For downlink data transmission as shown in FIG. 8A, ACK/NAK feedback may be sent on the PUCCH on the TDD CC based on the FDD timeline for a subset of subframes. The FDD timeline may be applied directly for some downlink-uplink subframe pairs. ACK/NAK feedback for remaining downlink subframes of the FDD CC may be handled using techniques such as bundling, multiplexing, etc. Similarly, CSI may be sent in uplink subframes of the TDD CC based on the FDD timeline/configuration whenever applicable and based on other rules otherwise.

Figure 9A:
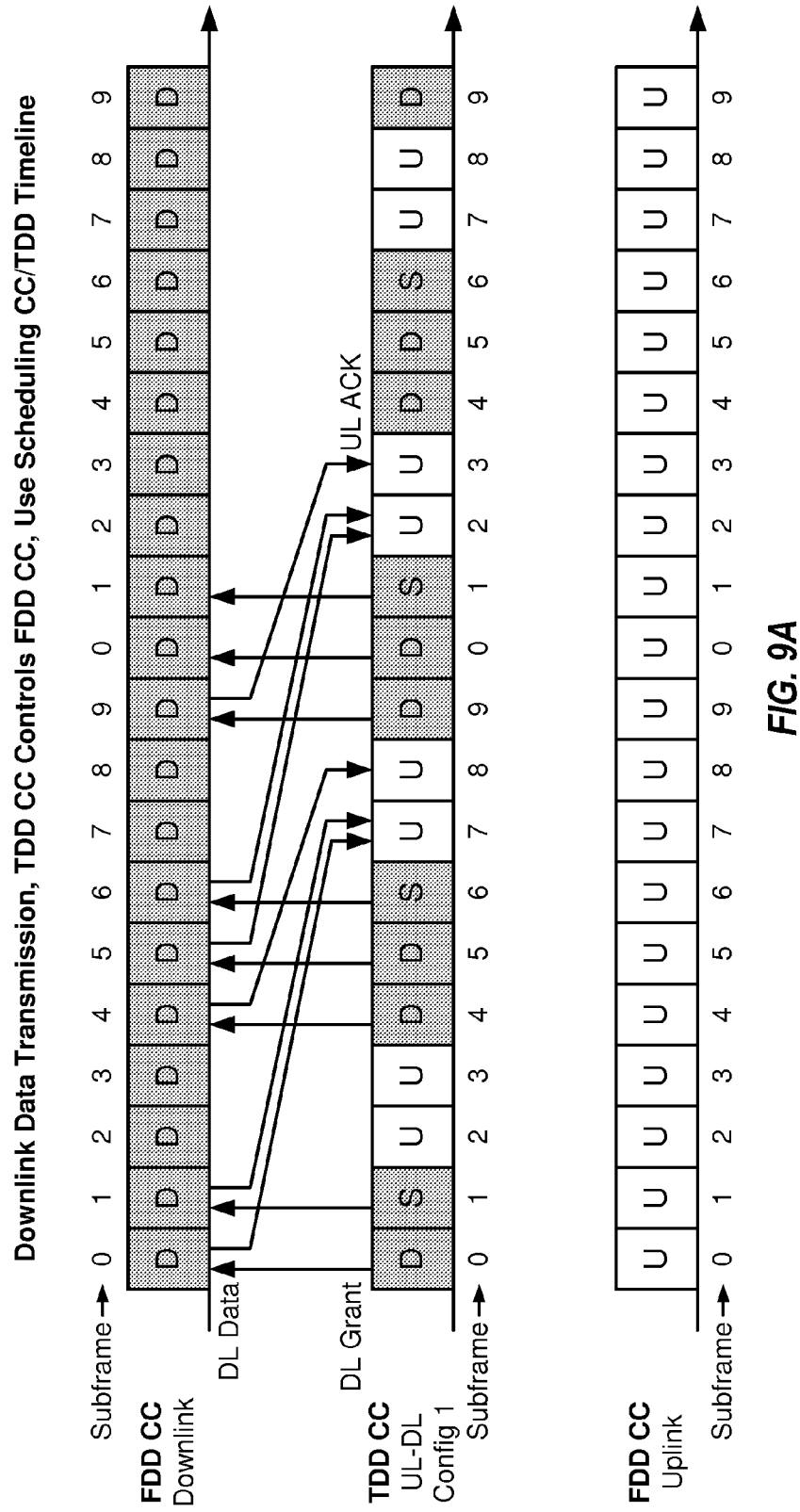
FIG. 9A shows an example of data transmission on the downlink in the second scenario with a TDD CC controlling an FDD CC using the TDD timeline of the scheduling CC.

FIG. 9A shows an example of data transmission on the downlink in the second scenario with a TDD CC controlling an FDD CC using the TDD timeline of the scheduling CC. In this case, control information is sent on the TDD CC, and downlink data is sent on the FDD CC. FIG. 9A shows an example in which the TDD CC has UL-DL configuration 1 and includes the downlink and uplink subframes shown in FIG. 9A. Downlink grants may be sent on the TDD CC in downlink subframes 0, 1, 4, 5, 6 and 9 for downlink data transmission on the FDD CC in downlink subframes 0, 1, 4, 5, 6 and 9, respectively. ACK/NAK feedback may be sent on the TDD CC in subframes 7, 7, 8, 2, 2 and 3 for data transmission on the FDD CC in downlink subframes 0, 1, 4, 5, 6 and 9, respectively.

Figure 9B:
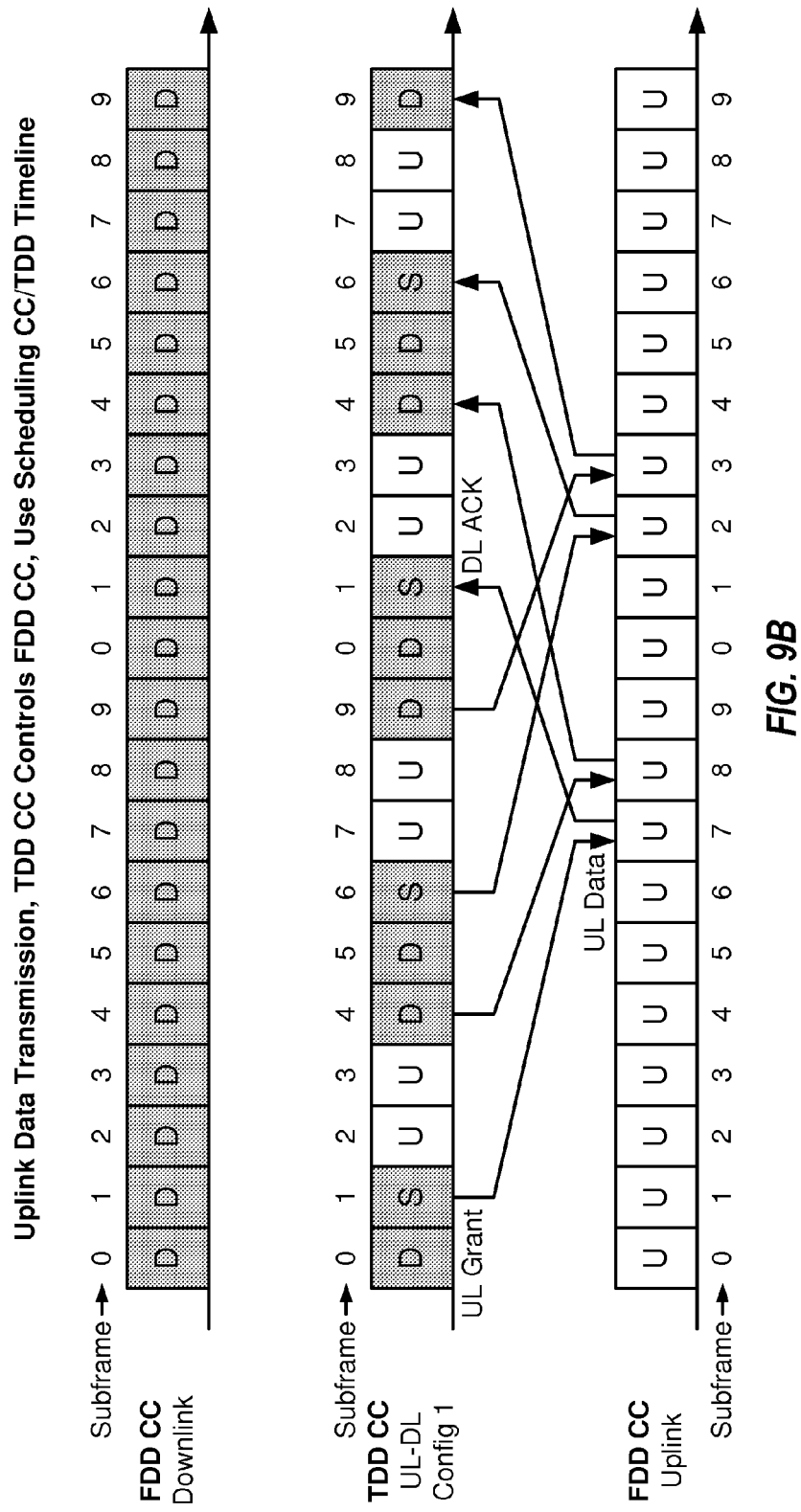
FIG. 9B shows an example of data transmission on the uplink in the second scenario with a TDD CC controlling an FDD CC using the TDD timeline of the scheduling CC.

FIG. 9B shows an example of data transmission on the uplink in the second scenario with a TDD CC controlling an FDD CC using the TDD timeline of the scheduling CC. In this case, control information is sent on the TDD CC, and uplink data is sent on the FDD CC. FIG. 9B shows an example in which the TDD CC has UL-DL configuration 1 and includes the downlink and uplink subframes shown in FIG. 9B. Uplink grants may be sent on the TDD CC in downlink subframes 1, 4, 6 and 9 for uplink data transmission on the FDD CC in uplink subframes 7, 8, 2 and 3, respectively. ACK/NAK feedback may be sent on the TDD CC in subframes 1, 4, 6 and 9 for data transmission on the FDD CC in uplink subframes 7, 8, 2 and 3, respectively.

As shown in FIGS. 9A and 9B, the TDD timeline may be applied directly to downlink and uplink subframes of the FDD CC that overlap with the downlink and uplink subframes of the TDD CC. New rules may be defined to support data transmission in the remaining downlink and uplink subframes of the FDD CC.

In one design, DCI may be sent on the TDD CC based on DCI formats for TDD. DCI for the FDD CC may be sent in a first search space on the TDD CC, and DCI for the TDD CC may be sent in a second search space on the TDD CC. In one design, the search spaces for the two CCs may be shared if these two CCs are associated with the same carrier bandwidth and the same transmission mode.

For uplink data transmission, PHICH collisions may occur and may be handled in similar manner as in LTE Release 10 carrier aggregation using different DMRS. The FDD CC includes more uplink subframes than the TDD CC, and new rules may be defined for the additional uplink subframes of the FDD CC. Some restrictions due to zero-PHICH subframes on the TDD CC may be defined.

For downlink data transmission as shown in FIG. 9A, ACK/NAK feedback for a subset of the downlink subframes of the FDD CC may be sent in uplink subframes of the TDD CC based on the TDD timeline. ACK/NAK feedback for the remaining downlink subframes of the FDD CC may be sent based on new rules, which may include bundling, multiplexing, etc. In some cases (depending on the UL-DL configuration of the TDD CC), the HARQ delay may be increased if the minimum processing time cannot be met. CSI feedback for the FDD CC may be sent in uplink subframes of the TDD CC and may follow the TDD timeline/configuration.

Using the HARQ timeline of the scheduled/FDD CC in the second scenario (e.g., as shown in FIGS. 8A and 8B) may provide certain advantages. For example, resource allocation management for cross-carrier and same-carrier scheduling of the FDD CC may be easier, and scheduling decision may be done at the same time.

Using the HARQ timeline of the scheduling/TDD CC in the second scenario (e.g., as shown in FIGS. 9A and 9B) may also provide certain advantages. For example, search spaces for scheduling both CCs may be shared if both CCs have the same carrier bandwidth and the same transmission mode. Control rule reuse may be better than when the HARQ timeline is based on the FDD CC.

In general, when a TDD CC controls an FDD CC in the second scenario, regardless of whether a TDD timeline or an FDD timeline is used, additional rules may be defined in order to cover all downlink and uplink subframes of the FDD CC. Using the TDD timeline for the FDD CC may provide better reuse of existing rules for TDD operation. These rules for TDD operation may be applied to downlink and uplink subframes of the FDD CC that overlap with the downlink and uplink subframes of the TDD CC. New rules may be defined for remaining downlink and uplink subframes of the FDD CC.

The hybrid timeline may be used to schedule an FDD CC with a TDD CC in the second scenario. In one design of the hybrid timeline, DCI may be sent on the TDD CC based on the TDD timeline of the scheduling TDD CC, and UCI may be sent on the FDD CC based on the FDD timeline of the scheduled FDD CC. For data transmission on the downlink, downlink grants may be sent on the TDD CC based on the TDD timeline, downlink data may be sent on the FDD CC as scheduled, and ACK/NAK feedback may be sent on the FDD CC based on the FDD timeline. UCI may thus be sent on the PUCCH on an uplink CC that is not linked with a downlink PCC, but is instead linked with a downlink CC on which data transmission actually occurs.

The hybrid timeline may be implemented in various manners. In one design, UCI may be sent on the PUCCH on the FDD CC in all subframes. In another design, UCI may be sent on the PUCCH on the FDD CC in only some subframes, e.g., subframes that cannot be handled by the TDD timeline.

The hybrid timeline may preserve the downlink PCC, which may be important for interference management in a heterogeneous network (HetNet). Interference conditions on the uplink may not be impacted in the same way as the downlink. Hence, UCI may be sent on another uplink CC with little impact to uplink interference conditions.

Figure 10A:
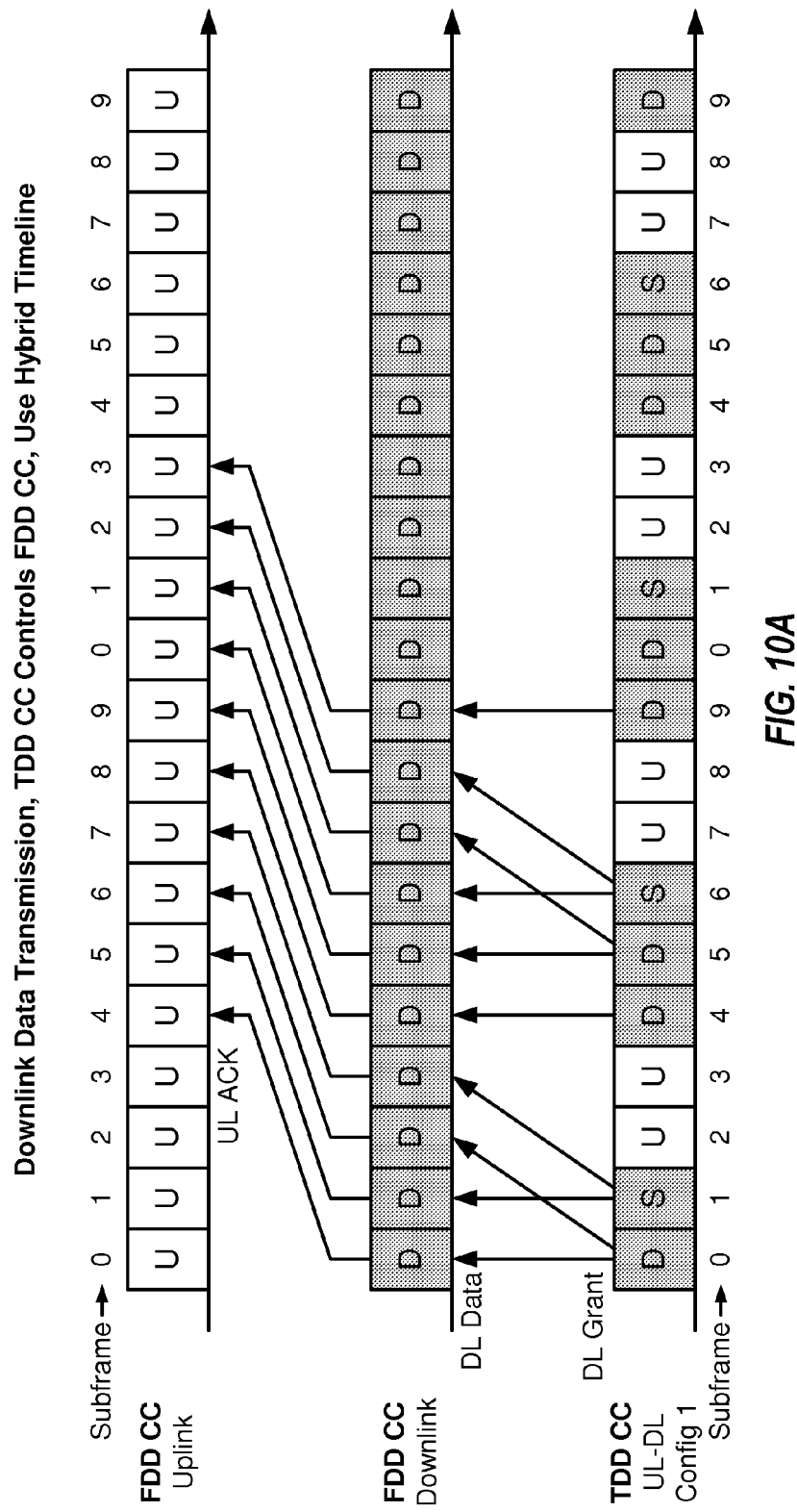
FIG. 10A shows an example of data transmission on the downlink in the second scenario with a TDD CC controlling an FDD CC using the hybrid timeline.

FIG. 10A shows an example of data transmission on the downlink in the second scenario with a TDD CC controlling an FDD CC using the hybrid timeline. FIG. 10A shows an example in which the TDD CC has UL-DL configuration 1 and includes the downlink and uplink subframes shown in FIG. 10A. Downlink grants may be sent on the TDD CC in downlink subframes 0, 1, 0, 1, 4, 5, 6, 5, 6 and 9 for downlink data transmission on the FDD CC in downlink subframes 0, 1, 2, 3, 4, 5, 6, 7, 8 and 9, respectively. ACK/NAK feedback may be sent on the FDD CC (instead of the TDD CC) in uplink subframes 4, 5, 6, 7, 8, 9, 0, 1, 2 and 3 for data transmission on the FDD CC in downlink subframes 0, 1, 2, 3, 4, 5, 6, 7, 8 and 9, respectively. If ACK/NAK feedback for downlink data transmission on the FDD CC is sent in uplink subframes of the TDD CC, then subframe bundling may be utilized, which may result in loss of downlink throughput.

The design shown in FIG. 10A attempts to balance the load of the PDCCH across downlink subframes of the TDD CC, so that at most two downlink grants are sent in any given downlink subframe of the TDD CC to schedule at most two downlink subframes of the FDD CC. Downlink grants may also be sent in other manners, e.g., to minimize HARQ delay. For example, downlink subframes 2 and 7 of the FDD CC may be scheduled via downlink grants sent in subframes 1 and 6, respectively, of the TDD CC (instead of in subframes 0 and 5 of the TDD CC as shown in FIG. 10A) in order to reduce HARQ delay. However, this would result in more unbalanced PDCCH load, with one downlink grant being sent in subframe 0 and three downlink grants being sent in subframe 1 of the TDD CC.

Figure 10B:
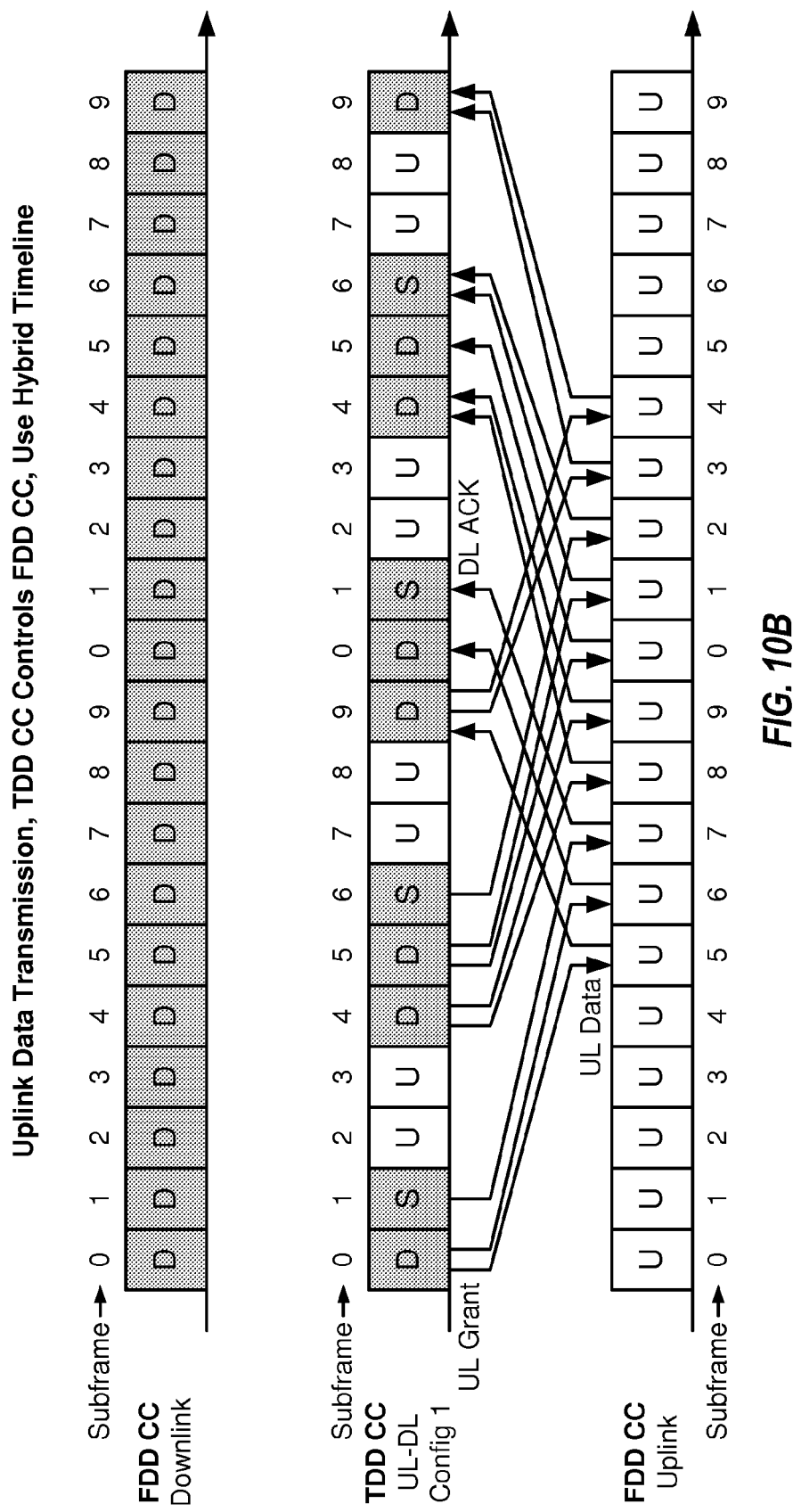
FIG. 10B shows an example of data transmission on the uplink in the second scenario with a TDD CC controlling an FDD CC using the hybrid timeline.

FIG. 10B shows an example of data transmission on the uplink in the second scenario with a TDD CC controlling an FDD CC using the hybrid timeline. FIG. 10B shows an example in which the TDD CC has UL-DL configuration 1 and includes the downlink and uplink subframes shown in FIG. 10B. Uplink grants may be sent on the TDD CC in downlink subframes 0, 0, 1, 4, 4, 5, 5, 6, 9 and 9 for uplink data transmission on the FDD CC in uplink subframes 5, 6, 7, 8, 9, 0, 1, 2, 3 and 4, respectively. ACK/NAK feedback may be sent on the TDD CC in subframes 9, 0, 1, 4, 4, 5, 6, 6, 9 and 9 for data transmission on the FDD CC in uplink subframes 5, 6, 7, 8, 9, 0, 1, 2, 3 and 4, respectively.

In one embodiment the PUCCH may reside on the TDD CC, with the TDD CC controlling a FDD CC. As described above, the PUCCH may carry UCI such as CSI, ACK/NAK feedback for data transmission sent to the UE on the downlink with HARQ, scheduling request, etc. Each subframe of the PUCCH may be used for sending control information related to another subframe. For example, a subframe may be used to send ACK/NAK feedback for acknowledging receipt of data from a preceding subframe. In cross-carrier control, the PUCCH subframes may be used for sending control information related to a subframe of another carrier.

In a cross-carrier control scheme, an association set of subframes may be defined that reflects the hybrid timelines. For example, when a TDD CC controls another TDD CC, the UL-DL configurations of the two TDD CCs may be the same. The association sets may be determined based on static, semi-static, or dynamic rules. In case of static associations, the information may be predetermined for each TDD UL-DL configuration. For example, the information may be stored (e.g., as a table of values) on the UE or eNB. For example, the UE or eNB may know of the subframe associations based on the stored data. For example, the UE or eNB may use knowledge of the associations to identify elements of control information associated with particular subframes in the set(s).

Many association sets are possible. For example, some association sets may associate subframes based on balancing a control load of the controlling CC, minimizing HARQ delay between associated subframes, etc. When a TDD CC controls an FDD CC, the subframe configuration between the TDD CC and FDD CC may be different. Modified downlink association sets may be defined mapping subframes of the TDD CC to the FDD CC. The association sets may include additional DL FDD subframes. Each UL subframe may be associated with a number ($M_{DL}$) of DL subframes. The UL subframes may be associated with TDD subframes and FDD subframes.

The number of elements ($M_{DL}$) in each set represents a number of DL subframes associated with a single UL subframe n. The modification from Table 2 to include DL FDD subframes may be based on design considerations such as balancing the load of the PDCCH to provide a more uniform distribution of the control load across the uplink subframes of the TDD CC and/or limiting delay for HARQ feedback. Balancing the load may be advantageous where HARQ delay is not a primary consideration or where a limited number of bits are available for transmitting control information with a particular uplink control channel format. For example, associations which balance or distribute control load may be advantageously used with PUCCH format 1b. When PUCCH format 3 is used, a larger payload is available, and a load balancing considerations may be less important. Minimizing HARQ delay may be advantageous for cases where cross-carrier control with cross-subframe DL scheduling is configured. Providing HARQ feedback is subject to a minimum HARQ delay or processing time (e.g., 3 ms in LTE). Minimizing HARQ delay may be done by associating subframes in the set of DL subframes with a next available UL subframe on the TDD carrier subject to the minimum HARQ processing time. A scheduling delay may be associated with the processing time (temporal) delay.

Table 6 shows association sets based on a design that balances the control load across the UL subframes. Table 6 lists values for different uplink subframes (e.g., $t_{D2}$ as illustrated in FIG. 3A) in which ACK/NAK may be sent on the PUCCH for the seven UL-DL configurations shown in Table 1. The values may represent subframe offsets (e.g., relative to an UL subframe) or other subframe identifiers and the association may map a group of downlink subframes, including both TDD subframes and FDD subframes, with a corresponding UL subframe on the controlling TDD carrier for carrying control information. Table 6 may be based on Table 2, with additional provisions for the FDD subframes. The additional values may enable coverage of DL transmissions on each subframe in the FDD radio frame. Here, additional values for the FDD subframes are shown in parentheses "( )". In the example of Table 6, the additional elements may be distributed across each UL-DL configuration to provide a uniform distribution. For example, each UL TDD subframe may be associated with a maximum number of additional elements. In one aspect, each UL TDD subframe may include at most two additional FDD subframes. In another example, each UL TDD may be associated with a maximum number of subframes that includes both TDD and FDD subframes. In another example, each UL TDD subframe may include at most one more element than a standard TDD configuration. For example, for UL-DL configuration 1, a TDD CC has six DL and special subframes. Because all subframes (e.g., ten subframes in a radio frame) of the FDD CC may be used for the DL there are four additional subframes which must be associated with the UL subframes of the TDD carrier. As an example, for UL-DL configuration 1, ACK/NAK may be sent on the PUCCH (i) in uplink subframe 2 to support data transmission on the PDSCH in downlink subframe 5, 6, or 7 of the previous radio frame or (ii) in uplink subframe 3 to support data transmission on the PDSCH in downlink subframes 8 or 9 of the previous radio frame.

In the example of Table 6, the association set for each subframe is designed to balance the control load on the UL subframes. Minimizing HARQ delay may be a secondary consideration. For example, for UL-DL configuration 1, subframes 3 and 8 include two elements while subframes 2 and 7 include three elements. Thus for UL-DL configuration 1, each UL subframe has at most one more element than another DL subframe. In another example, UL subframe may include at most two more elements than another DL subframe.

TABLE 6

Uplink-Downlink Configurations for TDD controlling FDD based on a balanced design

| UL-DL Configuration | Subframe Number n | | | | | | | | |
|---|---|---|---|---|---|---|---|---|---|
| | 0 | 1 | 2 | 3 | 4 | 5 | 6 | 7 | 8 | 9 |
| 0 | | | 6 | (5), (6) | 4, (5) | | | (5), 6 | (5) | 4, (5) |
| 1 | | | (5), 7, 6 | 4, (5) | | | | (5), 7, 6 | 4, (5) | |
| 2 | | | (5), 8, 7, 4, 6 | | | | | (5), 8, 7, 4, 6 | | |
| 3 | | | 7, 6, (10), 11 | 6, 5, (10) | 5, 4, (10) | | | | | |
| 4 | | | 12, 8, 7, (10), 11 | 6, 5, 4, 7, (10) | | | | | | |
| 5 | | | 13, 12, 9, 8, 7, 5, 4, 11, 6, (10) | | | | | | | |
| 6 | | | 7, (8) | (6), 7 | 5, (6) | | | (5), 7 | (5), 7 | |

Table 7 shows UL-DL configurations for a TDD CC controlling a FDD CC based on a design that minimizes HARQ delay. Table 7 lists values for different uplink subframes (e.g., $t_{D2}$ of FIG. 3A) in which ACK/NAK may be sent on the PUCCH for the seven UL-DL configurations shown in Table 1. An association set for Table 7 may be the mapping of each subframe to the values. The values may be offsets (e.g., relative to an UL subframe) to preceding subframes. The table of values may be an association table. Table 7 may be based on Table 2, with additional provisions for FDD subframes. The additional values may enable coverage of DL transmissions on each subframe in the FDD radio frame. Here, the additional entries are shown in parentheses "( )". In the example of Table 7, the additional elements are selected such that each UL TDD subframe provides HARQ feedback to a closest preceding DL subframe. In other words, the UL TDD subframe may be a closest succeeding subframe for providing HARQ feedback for the DL subframe(s). As an example, for UL-DL configuration 1, ACK/NAK may be sent on the PUCCH (i) in uplink subframe 2 to support data transmission on the PDSCH in downlink subframe 5, 6, 7, or 8 of the previous radio frame or (ii) in uplink subframe 3 to support data transmission on the PDSCH in downlink subframe 9 of the previous radio frame. In the example of Table 7, the control load of the PUCCH for each subframe is designed so as to minimize HARQ delay. Balancing the control load across the UL subframes may be a secondary consideration. For example, the association sets in Table 7 may include shorter HARQ delays than the association sets in Table 6, which may be based on a design that balances the control load. For example, comparing UL-DL configuration 1 of Table 7 with Table 6, Table 7 DL subframes 2 and 7 include delays of 5 subframes and also some shorter delays of 4 subframes for the additional FDD CC subframes, whereas Table 6 includes delays of 5 subframes for the additional FDD CC subframes.

As the example illustrates, Table 7 may provide shorter HARQ feedback delays for some DL subframes. On the other hand, the subframes in Table 6 may be more balanced compared to Table 7, and Table 6 may include more equal numbers of elements spread across the UL subframes for each UL-DL configuration.

TABLE 7

Uplink-Downlink Configurations for TDD controlling FDD based on a design that minimizes HARQ delay

| UL-DL Configuration | U Subframe Number n | | | | | | | | |
|---|---|---|---|---|---|---|---|---|---|
| | 0 | 1 | 2 | 3 | 4 | 5 | 6 | 7 | 8 | 9 |
| 0 | | | (5), 6 | (4), (5) | 4 | | | (4), (5), 6 | | 4, (5) |
| 1 | | | (4), (5), 7, 6 | 4 | | | | (4), (5), 7, 6 | 4 | |
| 2 | | | (5), 8, 7, 4, 6 | | | | | (5), 8, 7, 4, 6 | | |
| 3 | | | 7, 6, (10), 11 | 6, 5, (10) | 5, 4, (10) | | | | | |
| 4 | | | 12, 8, 7, (10), 11 | 6, 5, 4, 7, (10) | | | | | | |
| 5 | | | 13, 12, 9, 8, 7, 5, 4, 11, 6, (10) | | | | | | | |
| 6 | | | (4), (5), 7 | 7 | 5 | | | (4), (5), 7 | (4), 7 | |

In LTE where PUCCH format 1b with channel selection is used, there may be a unique $M_{DL}$ across all CCs within a subframe. In another embodiment, CCs may have different $M_{DL}$ within one subframe. For example, for a TDD CC of configuration 1, $M_{DL}=2$, whereas for an FDD CC, $M_{DL}=3$. The association sets may need to take into account combinations of different $M_{DL}$.

In the case of the balanced design, $M_{DL}$ for the FDD CC ($M_{FDD}$) and $M_{DL}$ for the TDD CC ($M_{TDD}$) may be selected such that the load is balanced across the UL subframes. In one aspect, the association sets for the balanced design may be selected to limit the $M_{FDD}$ to equal the $M_{TDD}$ plus one additional element such that $M_{TDD}=M_{DL}$ and $M_{FDD}=M_{DL}+1$.

In LTE Rel-10, a broadcast parameter $n_{PUCCH,i}^{(1)}$ may define a number of resources reserved for PUCCH format 1b resources. $n_{PUCCH,i}^{(1)}$ may be determined based on a number of the first control channel elements (CCE) used for transmission of the corresponding PDCCH on the primary cell (e.g., the TDD CC). If cross-carrier control is not configured, the values $n_{PUCCH,2}^{(1)}$ and $n_{PUCCH,3}^{(1)}$ may be determined according to a higher layer configuration. A transmit power control (TPC) field in the DCI format of the corresponding PDCCH may be used to determine the PUCCH resource values from one of the four resource values configured by the higher layers.

In one aspect, the modified association table for $M_{TDD}=M_{DL}$ and $M_{FDD}=M_{DL}+1$ may be based on existing TDD multiplexing tables corresponding to the value $M_{FDD}$, where entry for the PCC (e.g., the TDD CC) is modified to reflect $M_{FDD}$. A new table for $M_{FDD}=5$ may need to be established, or alternatively, support for $M_{FDD}=5$ may not be supported in case carrier aggregation of FDD CC and TDD CC when the PUCCH is configured on the TDD CC.

In another aspect, the modified association table may be based on existing TDD multiplexing tables corresponding to the value $M_{TDD}$, where entries for the SCC (e.g., the FDD CC) is modified to reflect $M_{TDD}$. Additional entries corresponding to the additional FDD subframes may first be bundled/multiplexed with one of the existing entries, and sent on the UL subframe. The bundled/multiplexed data may be sent in an uplink control format of the TDD carrier.

In the case of using PUCCH format 3, LTE Rel-10 methods may be reused for aggregation of FDD CC and TDD CC where the number of bits for each cell in a subframe may be different. For example, LTE Rel-10 specifies that a UE may determine the number of HARQ bits associated with an UL subframe n based on the number of configured serving cells, the downlink transmission modes configured for each serving cell and $M_{DL}$ which is the number of elements in a set K. A value ($O_{ACK}$) may be defined as the number of HARQ bits for each serving cell, and it may be determined on the $M_{TDD}$ for the TDD CC and $M_{FDD}$ for the FDD CC. If the number of feedback bits is larger than 20, spatial ACK/NACK bundling of code words within a DL subframe may be performed for each CC, as in LTE Rel-10. In the case where feedback is larger than 20, even after spatial bundling (e.g., 5 CCs with $M_{FDD}>4$) additional rules may be used. For example, bits may be bundled across subframes of the FDD CC with $M_{FDD}>4$.

For cross-carrier control with the TDD CC controlling the FDD CC, only DL and special subframes on the TDD CC may be used for assignments and grants. In contrast, for the FDD CC controlling the TDD CC, all subframes on the FDD CC may be available for scheduling. Using the TDD CC to control the FDD CC may present challenges because the FDD CC includes more subframes than the TDD CC. Two possible approaches are discussed below for granting resources when the TDD CC controls the FDD CC.

In one embodiment, only a subset of subframes on the FDD CC may be scheduled. For example, only those subframes on the DL or UL of the FDD CC that correspond to the DL or UL of the TDD CC may be scheduled. In this embodiment, the unscheduled subframes may be wasted as the UE does not use the unscheduled subframes. If the subframes are not cross-scheduled from the TDD CC, however, the UE may still be able to use the subframes.

In another embodiment, all subframes on the DL or UL of the FDD CC may be scheduled. The scheduling may be based on cross-subframe control or multi-transmission time interval scheduling. Scheduling of the set of subframes through cross-subframe control from a specific subframe may be static, semi-static, or dynamic. In case of static scheduling, the information may be predetermined for each TDD UL-DL configuration. For example, the information may be stored (e.g., as a table of values) on the UE or eNB. For example, the UE or eNB may know of the subframe associations based on the stored data. For example, the UE or eNB may use knowledge of the associations to identify elements of control information associated with particular subframes in the set(s). In the case of semi-static scheduling, the configuration may be specified by RRC configuration. For example, the UE may receive RRC configuration messages (e.g., periodically, at predetermined time periods, etc.) to use a particular association set. In the case of dynamic scheduling, the information may be provided by a cross-subframe indicator (e.g., via the eNB) to the UE. The dynamic scheduling may be a combination of static or semi-static configurations. The scheduling may be bounded by allowing at least three ms processing time by the UE. DL assignments may be transmitted in the same subframe as the associated DL subframe. In other words, for DL assignments, the offset between the assigning DL subframe and associated DL subframe may be zero.

A static configuration may be defined for each TDD UL-DL configuration. On the UL scheduling, in an example, for TDD UL-DL configurations 1-6 (see Table 1) and normal HARQ operation, when a UE detects the PDCCH with DCI format 0 and/or a PHICH transmission in a subframe n intended for the UE, the UE may adjust the corresponding PUSCH transmission in subframe n+k, with k defined by the association table.

Table 8 shows a set of configurations covering all possible resource grants for UL subframes in a radio frame. A resource grant may be an uplink grant or a downlink assignment. An association set for Table 8 may be the mapping of each subframe (e.g., $t_{U1}$ of FIG. 3B) to the values. The values may be offsets to succeeding subframes. The table of values may be an association table. As an example, for UL-DL configuration 1, UL resource grants may be sent on the PDCCH (i) in downlink subframe 0 to grant UL resources for subframes 4, 5, or 6 of the current radio frame or (ii) in downlink subframe 1 to grant UL resources for subframes 5, 6, or 7 of the current radio frame. It may be noted that the example for the subframes 0 and 1 show redundant UL resources grants for subframes 5 and 6. Only a subset of the possible UL subframe configurations needs to be configured or specified for each UL-DL TDD CC configuration. Table 9 below shows one example configuration based on the set of possible configurations of Table 8.

TABLE 8

Set of configurations covering all possible grants for UL subframes in a radio frame

| UL-DL Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 4, 5, 6 | 4, 5, 6 | | | | 4, 5, 6 | 4, 5, 6 | | | |
| 1 | 4, 5, 6 | 4, 5, 6 | | | 4, 5, 6, 7 | 4, 5, 6 | 4, 5, 6 | | | 4, 5, 6, 7 |
| 2 | 4, 5, 6 | 4, 5, 6 | 4, 5, 6, 7 | 4, 5, 6, 7 | 4, 5, 6 | 4, 5, 7 | | 4, 5, 6, 7 | 4, 5, 6, 7 | |
| 3 | 4, 5, 6, 7 | 4, 5, 6, 7 | | | 4, 5, 6 | 4, 5 | 4 | 4, 7 | 4, 6, 7 | |

TABLE 8-continued

Set of configurations covering all possible grants for UL subframes in a radio frame

| UL-DL Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 4 | 4, 5, 6, 7 | 4, 5, 6, 7 | | | 4, 5, 6, 7 | 4, 5, 6 | 4, 5 | 4, 7 | 4, 6, 7 | 4, 5, 6, 7 |
| 5 | 4, 5, 6, 7 | 4, 5, 6, 7 | | 4, 5 6, 7 | 4, 5, 6, 7 | 4, 5, 6 | 4, 5, 7 | 4, 6, 7 | 4, 5, 6, 7 | 4, 5, 6, 7 |
| 6 | 5, 6, 7 | 4, 5, 7 | | | 4, 5, 6, 7 | | 4, 5, 7 | | | 5, 6, 7 |

Table 9 shows one configuration from all the possible configurations of Table 8 to cover all UL subframes in a radio frame. An association set for Table 9 may be the mapping of each subframe (e.g., $t_{U1}$ of FIG. 3B) to the values. The values may be offsets to succeeding subframes. The table of values may be an association table. As an example, for UL-DL configuration 1, UL resource grants may be sent on the PDCCH (i) in downlink subframe 0 to grant UL resources for subframes 4 or 5 of the current radio frame or (ii) in downlink subframe 1 to grant UL resources for subframes 6 or 7 of the current radio frame. In the example of Table 9, the resource grant load of the PDCCH for each subframe is designed so as to balance the resource grant load. For example, for UL-DL configuration 1, subframes 0, 1, 5, and 6 include 2 resource grants while subframes 4 and 9 include one resource grant. Thus for UL-DL configuration 1, each subframe has at most one more resource grant than another DL subframe. In another example, each subframe may include at most two more resource grants than another DL subframe. In this instance, the design balances the grant load across the DL subframes.

TABLE 9

One example configuration to cover UL subframes in a radio frame based on a configuration to balance resource grant load

| UL-DL Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 4, 5 | 5, 6 | | | | 4, 5 | 5, 6 | | | |
| 1 | 4, 5 | 5, 6 | | | 4 | 4, 5 | 5, 6 | | | 4 |
| 2 | 4 | 4, 5 | | 4 | 4 | 4 | 4, 5 | | 4 | 4 |
| 3 | 4, 6 | 6, 7 | | | 4 | 4 | | 4 | 4 | 4, 6 |
| 4 | 4, 5 | 5, 6 | | | 4 | 4 | 4 | 4 | 4 | 4 |
| 5 | 4 | 4, 5 | | 4 | 4 | 4 | 4 | 4 | 4 | 4 |
| 6 | 5, 7 | 5, 7 | | | | 4, 7 | 4, 5, 7 | | | 5 |

Table 10 shows one configuration to cover all UL subframes in a radio frame. As association set for Table 10 may be the mapping of each subframe (e.g., $t_{U1}$ of FIG. 3B) to the values. The values may be offsets to succeeding subframes. The table of values may be an association table. As an example, for UL-DL configuration 1, UL resource grants may be sent on the PDCCH (i) in downlink subframe 0 to grant UL resources for subframe 4 of the current radio frame or (ii) in downlink subframe 1 to grant UL resources for subframes 5, 6, or 7 of the current radio frame. In the example of Table 10, the resource grant load of the PDCCH for each subframe is designed so as to minimize the scheduling delay. For example, comparing UL-DL configuration 1 of Table 10 with Table 9, Table 10 downlink subframes include shorter delays of 4 (subframe 0) and 4, 5, 6 (subframe 1), whereas Table 10 includes longer delays of 4, 5 (subframe 0) and 5, 6 (subframe 1). On the other hand, the subframes in Table 9 are more balanced with a more equal number of elements spread across the subframes.

TABLE 10

One example configuration to cover UL subframes in a radio frame based on a configuration to minimize scheduling delay

| UL-DL Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 4, 5, 6 | | | | 4 | 4, 5, 6 | | | |
| 1 | 4 | 4, 5, 6 | | | 4 | 4 | 4, 5, 6 | | | 4 |
| 2 | 4 | 4, 5 | | 4 | 4 | 4 | 4, 5 | | 4 | 4 |
| 3 | 4 | 4, 5, 6, 7 | | | | 4 | 4 | 4 | 4 | 4 |
| 4 | 4 | 4, 5, 6 | | | | 4 | 4 | 4 | 4 | 4 |
| 5 | 4 | 4, 5 | | 4 | 4 | 4 | 4 | 4 | 4 | 4 |
| 6 | 4 | 4, 5, 6, 7 | | | | 4 | 4, 5, 6 | | | 4 |

For DL scheduling, the overlapping DL subframes of the scheduled CC and scheduling CC may follow rules from LTE Rel-8/9/10. In cases where the scheduling CC has an UL subframe and the scheduled CC has a DL subframe, cross-subframe scheduling may be utilized.

Table 11 shows a set of configurations to cover all possible assignments or grants for DL subframes in a radio frame. An association set for Table 11 may be the mapping of each subframe (e.g., $t_{D1}$ of FIG. 3A) to the values. The values may be offsets to succeeding subframes. For DL assignments, the assignment may be transmitted in the same subframe as the data such that the offset may be zero. The table of values may be an association table. As an example, for UL-DL configuration 1, DL resource grants may be sent on the PDCCH (i) in downlink subframe 0 to grant DL resources for subframes 0 or 2 of the current radio frame or (ii) in downlink subframe 1 to grant UL resources for subframes 1, 2, or 3 of the current radio frame. It may be noted that the example for the subframes 0 and 1 show redundant DL assignments for subframe 2. Only a subset of the possible DL subframe configurations may need to be configured or specified for each UL-DL TDD CC configuration. Table 12 below shows one example configuration.

TABLE 11

Set of configurations covering all possible assignments for DL subframes in a radio frame

| UL-DL Configuration | 0 | 1 | 2 | 3 | 4 | 5 | 6 | 7 | 8 | 9 |
|---|---|---|---|---|---|---|---|---|---|---|
| 0 | 0, 2, 3 | 0, 1, 2, 3 | | | | 0, 2, 3 | 0, 1, 2, 3 | | | |
| 1 | 0, 2 | 0, 1, 2 | | | 0 | 0, 2 | 0, 1, 2 | | | 0 |
| 2 | 0, 2 | 0, 1 | | 0 | 0 | 0 | 0, 1 | | 0 | 0 |
| 3 | 0, 2, 3 | 0, 1, 2, 3 | | | 0 | 0 | | 0 | 0 | 0 |
| 4 | 0, 2 | 0, 1, 2 | | | 0 | 0 | 0 | 0 | 0 | 0 |
| 5 | 0, 2 | 0, 1 | | 0 | 0 | 0 | 0 | 0 | 0 | 0 |
| 6 | 0, 2, 3 | 0, 1, 2, 3 | | | | 0, 2 | 0, 1, 2 | | | 0 |

Table 12 shows one configuration from all the possible configurations of Table 11 to cover all DL subframes in a radio frame. An association set for Table 12 may be the mapping of each subframe (e.g., $t_{D1}$ of FIG. 3A) to the values/elements. The values may be offsets to succeeding subframes.

In the example of Table 12, the elements are distributed across each UL-DL configuration to provide a uniform distribution. Minimizing scheduling delay may be a secondary consideration. For example, each DL TDD subframe may include a maximum number of additional elements. In one aspect, each DL TDD subframe may include at most two additional elements. In another example, each DL TDD may include a maximum number of total elements. In another example, each DL TDD subframe may include at most two more elements than another DL TDD subframe in the same UL-DL configuration.

As an example, for UL-DL configuration 1, DL assignments may be sent on the PDCCH (i) in downlink subframe 0 to assign DL resources for subframes 0 or 2 of the current radio frame or (ii) in downlink subframe 1 to assign DL resources for subframes 1 or 3 of the current radio frame. In the example of Table 12, the DL assignment load of the PDCCH for each subframe is designed so as to balance the assignment load. For example, for UL-DL configuration 1, subframes 0, 1, 5, and 6 include 2 resource grants while subframes 4 and 9 include one resource grant. Thus for UL-DL configuration 1, each subframe has at most one more resource grant than another DL subframe. In one aspect, the resource grant or assignment load for UL-DL configurations 0-6 may be balanced such that each subframe has at most two more resource grants than another DL subframe.

TABLE 12

One example configuration to cover DL subframes in a radio frame based on a configuration to balance assignment load

| UL-DL Configuration | 0 | 1 | 2 | 3 | 4 | 5 | 6 | 7 | 8 | 9 |
|---|---|---|---|---|---|---|---|---|---|---|
| 0 | 0, 2 | 0, 2, 3 | | | | 0, 2 | 0, 2, 3 | | | |
| 1 | 0, 2 | 0, 2 | | | 0 | 0, 2 | 0, 2 | | | 0 |
| 2 | 0 | 0, 1 | | 0 | 0 | 0 | 0, 1 | | 0 | 0 |
| 3 | 0, 2 | 0, 2, 3 | | | | 0 | 0 | 0 | 0 | 0 |
| 4 | 0, 2 | 0, 2 | | | 0 | 0 | 0 | 0 | 0 | 0 |
| 5 | 0 | 0, 1 | | 0 | 0 | 0 | 0 | 0 | 0 | 0 |
| 6 | 0, 2 | 0, 2, 3 | | | | 0, 2 | 0, 2 | | | 0 |

Table 13 shows one configuration from all the possible configurations of Table 11 to cover all DL subframes in a radio frame. An association set for Table 13 may be the mapping of each subframe (e.g., $t_{D1}$ of FIG. 3A) to the values. The values may be offsets to succeeding subframes. As an example, for UL-DL configuration 1, DL assignments may be sent on the PDCCH (i) in downlink subframe 0 to assign DL resources for subframe 4 of the current radio frame or (ii) in downlink subframe 1 to assign DL resources for subframes 5, 6, or 7 of the current radio frame. In the example of Table 13, the assignment load of the PDCCH for each subframe is designed so as to minimize the scheduling delay.

TABLE 13

One example configuration to cover DL subframes in a radio frame based on a configuration to minimize scheduling delay

| UL-DL Configuration | 0 | 1 | 2 | 3 | 4 | 5 | 6 | 7 | 8 | 9 |
|---|---|---|---|---|---|---|---|---|---|---|
| 0 | 0 | 0, 1, 2, 3 | | | | 0 | 0, 1, 2, 3 | | | |
| 1 | 0 | 0, 1, 2 | | | 0 | 0 | 0, 1, 2 | | | 0 |
| 2 | 0 | 0, 1 | | 0 | 0 | 0 | 0, 1 | | 0 | 0 |
| 3 | 0 | 0, 1, 2, 3 | | | | 0 | 0 | 0 | 0 | 0 |
| 4 | 0 | 0, 1, 2 | | | 0 | 0 | 0 | 0 | 0 | 0 |
| 5 | 0 | 0, 1 | | 0 | 0 | 0 | 0 | 0 | 0 | 0 |
| 6 | 0 | 0, 1, 2, 3 | | | | 0 | 0, 1, 2 | | | 0 |

Tables may define possible cross-subframe scheduling of each subframe from a TDD CC. RRC protocol configuration data may define an applicable offset (k) for each UE and cross-scheduling CC. In one example, the configuration may be provided based on the scheduling TDD CC UL-DL configuration and defined for cross-scheduling of all subframes (e.g., as if the cross-scheduled CC were an FDD CC). The configuration for a cross-scheduled TDD CC may be derived implicitly for each UL-DL TDD CC configuration, taking into account only applicable subframes, as the subset of the configuration for FDD CC cross-scheduling.

The same configuration may be used for a group of cross-scheduled CCs. For example, all cross-scheduled FDD CCs may use the same configuration. For example, all cross-scheduled TDD CCs of the same UL-DL configuration may use the same given configuration.

In another embodiment, configuration may be given per each cross-scheduled CC configuration. Cross scheduled CCs may be different, e.g., FDD CC and a TDD CC, and possibly of different TDD UL-DL configurations and may have different scheduling requirements. For example, not all subframes may need to be scheduled on all SCCs.

In a semi-static configuration, RRC protocol configuration data may allow cross scheduling of a subframe from a single subframe only. This approach may be similar to that used for LTE Rel-10 for cross-carrier scheduling. Cross-scheduling of a subframe from multiple subframes may be enabled by RRC protocol configuration data, which may offer more scheduling flexibility. Distribution of the PDCCH load in case control space is crowded.

In one example, RRC configuration data may be used to select a subset from the set of all possible configurations. For example, for TDD UL-DL configuration 1 the subset to be used may be configured by RRC configuration data.

In another embodiment, dynamic cross-subframe schedule may be utilized as follows. Dynamic cross-scheduling may be utilized in conjunction with semi-static and/or static configurations. Dynamic scheduling may be performed based on configuration such as where a UE may be cross-scheduled on a subframe only from particular subframe(s) of particular CC(s). For example, each subframe may schedule up to 2 other subframes. Dynamic cross-scheduling may be based on all possible cross-subframe scheduling options for a specific TDD UL-DL configuration of the scheduling CC. This may provide the most flexibility; however, overhead for signaling may be increased.

Dynamic scheduling may configure non-overlapping UE-specific search spaces for cross-subframe scheduling. A search space may be designated for each subframe that may not be shared for scheduling of different subframes. This method may be less efficient in terms of the search space utilization. No additional overhead for DCI for subframe indication may be needed. However, this may be difficult. Dynamic scheduling may utilize various resource allowance sizes. Additional bit(s) in the DCI format may be needed to cover the maximum number of subframes that may be scheduled from one subframe. For example, three subframes may be scheduled in the UL and six in the DL, not including the scheduling DL subframe itself. In this case, two bits for the three UL subframes, and three bits for the six DL subframes may be needed. Limiting the maximum number of subframes that may be scheduled from one subframe may reduce the overhead. For example, a rule may limit the scheduling to two other subframes. If a subframe scheduling correspondence is defined such that up to two UL subframes may be scheduled from a DL subframe, the number of bits is reduced to one bit for UL scheduling. The configuration (e.g., table) may specify which two subframes may be scheduled. The information may be embedded in a carrier indication field (CIF). For example, the CIF may include three bits, with two bits (e.g., supporting four carriers) used for carrier indication and one bit (e.g., supporting two subframes) for subframe indication.

Figure 17:
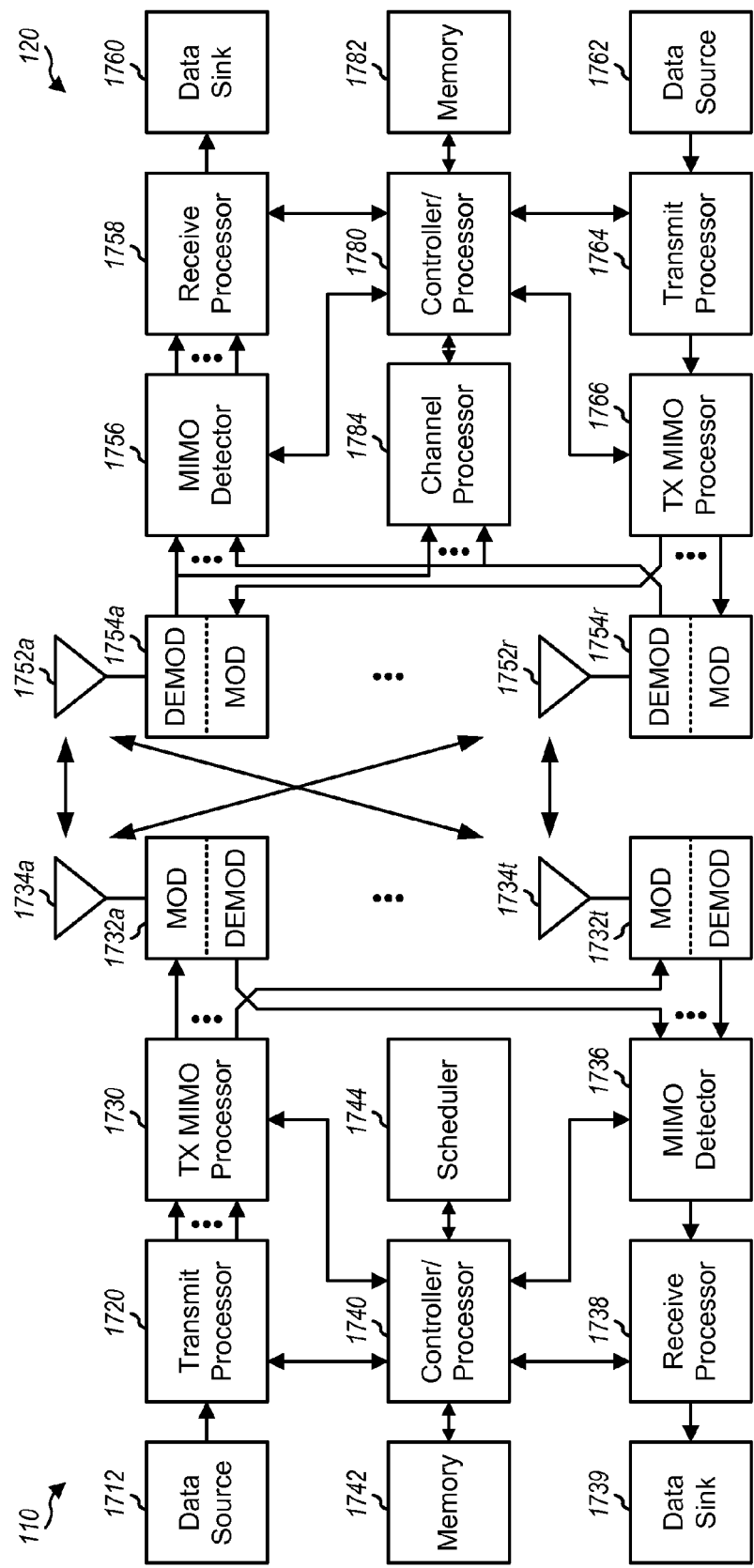
FIG. 17 shows a block diagram of an example base station/eNB and example UE, which may be one of the base stations/eNBs and one of the UEs in FIG. 1.

FIG. 17 shows a block diagram of an example base station/eNB 110y and an example UE 120y, which may be one of the base stations/eNBs and one of the UEs in FIG. 1. Base station 110y may be equipped with T antennas 1734a through 1734t, and UE 120y may be equipped with R antennas 1752a through 1752r, where in general T≥1 and R≥1.

At base station 110y, a transmit processor 1720 may receive data from a data source 1712 for one or more UEs, process (e.g., encode and modulate) the data for each UE based on one or more modulation and coding schemes selected for that UE, and provide data symbols for all UEs. Transmit processor 1720 may also process control information (e.g., for downlink grants, uplink grants, ACK/NAK feedback, etc.) and provide control symbols. Processor 1720 may also generate reference symbols for reference signals. A transmit (TX) multiple-input multiple-output (MIMO) processor 1730 may precode the data symbols, the control symbols, and/or the reference symbols (if applicable) and may provide T output symbol streams to T modulators (MOD) 1732a through 1732t. Each modulator 1732 may process its output symbol stream (e.g., for OFDM, etc.) to obtain an output sample stream. Each modulator 1732 may further condition (e.g., convert to analog, amplify, filter, and upconvert) its output sample stream to obtain a downlink signal. T downlink signals from modulators 1732a through 1732t may be transmitted via T antennas 1734a through 1734t, respectively.

At UE 120y, antennas 1752a through 1752r may receive the downlink signals from base station 110y and/or other base stations and may provide received signals to demodulators (DEMODs) 1754a through 1754r, respectively. Each demodulator 1754 may condition (e.g., filter, amplify, down-convert, and digitize) its received signal to obtain input samples. Each demodulator 1754 may further process the input samples (e.g., for OFDM, etc.) to obtain received symbols. A MIMO detector 1756 may obtain received symbols from all R demodulators 1754a through 1754r, perform MIMO detection on the received symbols, and provide detected symbols. A receive processor 1758 may process (e.g., demodulate and decode) the detected symbols, provide decoded data for UE 120y to a data sink 1760, and provide decoded control information to a controller/processor 1780. A channel processor 1784 may measure the channel response and interference for different carriers based on reference signals received on these carriers and may determine CSI for each carrier of interest.

On the uplink, at UE 120y, a transmit processor 1764 may receive and process data from a data source 1762 and control information (e.g., ACK/NAK feedback, CSI, etc.) from controller/processor 1780. Processor 1764 may also generate reference symbols for one or more reference signals. The symbols from transmit processor 1764 may be precoded by a TX MIMO processor 1766 if applicable, further processed by modulators 1754a through 1754r (e.g., for SC-FDM, OFDM, etc.), and transmitted to base station 110y. At base station 110y, the uplink signals from UE 120y and other UEs may be received by antennas 1734, processed by demodulators 1732, detected by a MIMO detector 1736 if applicable, and further processed by a receive processor 1738 to obtain decoded data and control information sent by UE 120y and other UEs. Processor 1738 may provide the decoded data to a data sink 1739 and the decoded control information to controller/processor 1740.

Controllers/processors 1740 and 1780 may direct the operation at base station 110y and UE 120y, respectively. Processor 1740 and/or other processors and modules at base station 110y may perform or direct process 1100 in FIG. 11, process 1500 in FIG. 15, process 1600 in FIG. 16, and/or other processes for the techniques described herein. Processor 1780 and/or other processors and modules at UE 120y may perform or direct process 1200 in FIG. 12, process 1300 in FIG. 13, process 1400 in FIG. 14, and/or other processes for the techniques described herein. Memories 1742 and 1782 may store data and program codes for base station 110y and UE 120y, respectively. A scheduler 1744 may schedule UEs for data transmission on the downlink and/or uplink.

Figure 11:
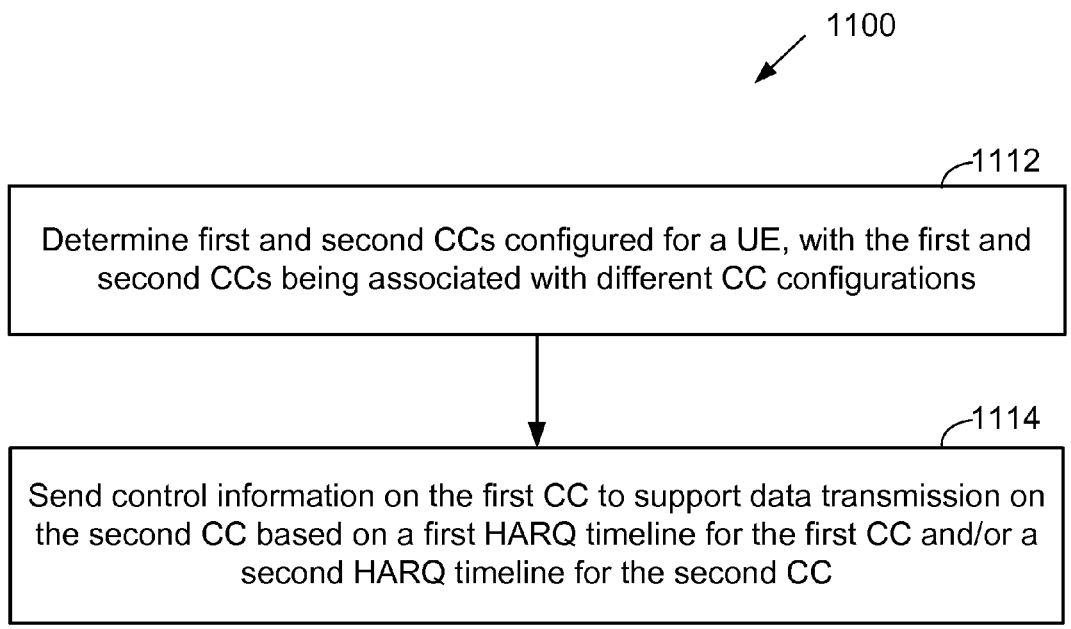
FIG. 11 shows an example of a process for sending control information in a wireless network.

FIG. 11 shows an example of a process 1100 for sending control information in a wireless network. Process 1100 may be performed by a base station (e.g., an eNB), as described below, or by a similar network entity. The base station may determine first and second CCs configured for a UE, with the first and second CCs being associated with different CC configurations (block 1112). In one design, the different CC configurations may correspond to a combination of FDD and TDD. One CC may be associated with FDD, and the other CC may be associated with TDD. In another design, the different CC configurations may correspond to different UL-DL configurations of the first and second CCs for TDD. The CC configurations of the two CCs may also be different in other manners. The base station may send control information on the first CC to support data transmission on the second CC based on a first HARQ timeline for the first CC and/or a second HARQ timeline for the second CC (block 1114).

In the first scenario described above, the first CC may be associated with FDD, and the second CC may be associated with TDD. The first/FDD CC may control the second/TDD CC. In one design, the HARQ timeline of the scheduled CC (or the TDD timeline) may be utilized, e.g., as shown in FIGS. 6A and 6B. In this design, for block 1114, the base station may send the control information on the first CC based on the second HARQ timeline for an UL-DL configuration of the second CC for TDD. In another design, the HARQ timeline of the scheduling CC (or the FDD timeline) may be utilized, e.g., as shown in FIGS. 7A and 7B. In this design, for block 1114, the base station may send the control information on the first CC based on the first HARQ timeline for the first CC. For both designs, data transmission may be scheduled on the second CC based on the first or second HARQ timeline only in downlink and uplink subframes of the second CC matching downlink and uplink subframes of the first CC. Data transmission in remaining subframes may be scheduled based on other rules.

In the second scenario described above, the first CC may be associated with TDD, and the second CC may be associated with FDD. The first/TDD CC may control the second/FDD CC. In one design, the HARQ timeline of the scheduled CC (or the FDD timeline) may be utilized, e.g., as shown in FIGS. 8A and 8B. In this design, for block 1114, the base station may send the control information on the first CC based on the second HARQ timeline for the second CC. In another design, the HARQ timeline of the scheduling CC (or the TDD timeline) may be utilized, e.g., as shown in FIGS. 9A and 9B. In this design, for block 1114, the base station may send the control information on the first CC based on the first HARQ timeline for an uplink-downlink configuration of the first CC for TDD.

In another design, a hybrid timeline may be utilized, e.g., as shown in FIG. 10A or 10B. The first/TDD CC may control the second/FDD CC, e.g., as shown in FIG. 10A. The base station may send DCI on the first CC based on the first HARQ timeline for the first CC. The base station may receive UCI sent on the second CC based on the second HARQ timeline of the second CC.

Figure 12:
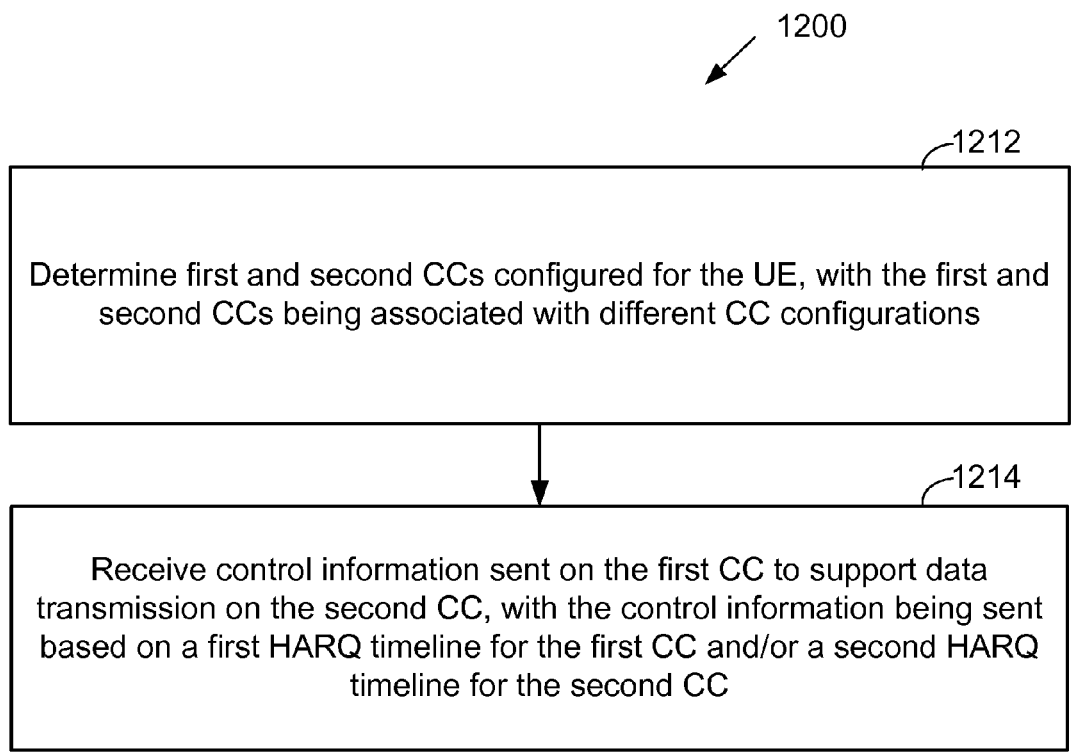
FIG. 12 shows an example of a process for receiving control information in a wireless network.

FIG. 12 shows an example of a process 1200 for receiving control information in a wireless network. Process 1200 may be performed by a UE, as described above, or by a similar mobile entity or device. The UE may determine first and second CCs configured for the UE, with the first and second CCs being associated with different CC configurations (block 1212). The UE may receive control information sent on the first CC to support data transmission on the second CC, with the control information being sent based on a first HARQ timeline for the first CC and/or a second HARQ timeline for the second CC (block 1214).

Figure 13:
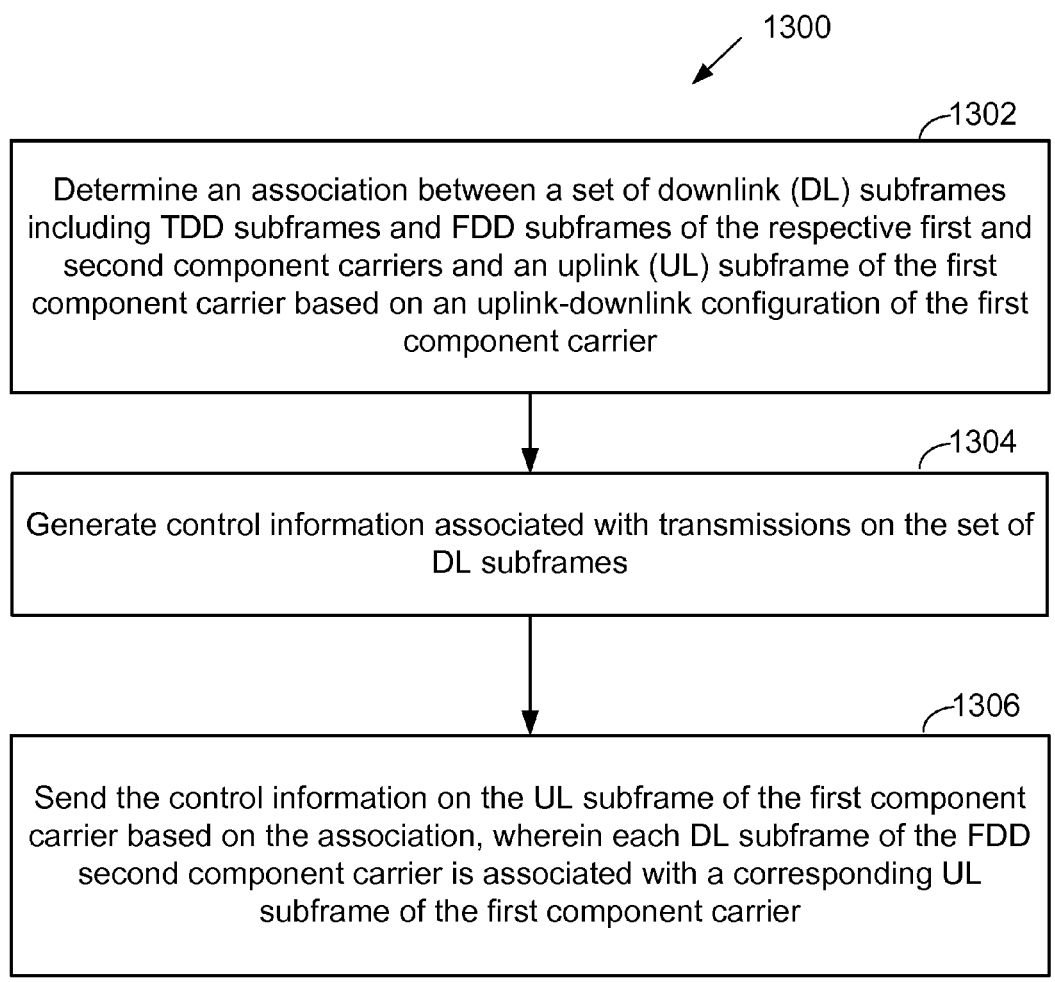
FIG. 13 shows an example of a process of a mobile device for sending control information in a wireless network.

FIG. 13 shows an example of a process 1300 for sending control information in a wireless network. Process 1300 may be performed by a mobile device (e.g., a UE), as described above, or by a similar mobile entity or device. The mobile device may determine an association between a set of DL subframes including TDD subframes and FDD subframes of the respective first and second component carriers and a UL subframe of the first component carrier based on an uplink-downlink configuration of the first component carrier (block 1302). In one example, block 1302 may be performed by processor 1708, or processor 1708 coupled to memory 1782. The association, for example, may provide a mapping between the set of DL subframes and the UL subframe of the first component carrier. The association may be stored (e.g., as a table of values, as a function that calculates the values, etc.) on a memory of the mobile device. The association may be based on subframe offsets.

In one design, the mobile device may generate control information associated with transmissions on the set of DL subframes (block 1304). In one example, block 1304 may be performed by processor 1708, or processor 1708 coupled to memory 1782.

In one design, the mobile device may send the control information on the UL subframe of the first component carrier based on the association, wherein each DL subframe of the FDD second component carrier is associated with a corresponding UL subframe of the first component carrier (block 1306). In one example, block 1306 may be performed by any combination of antennas 1752, modulators 1754, processors 1708, 1764, 1766, and/or memory 1782, 1762. The control information may be distributed on the UL subframes to balance the load on the UL subframes. The control information may be sent on UL subframes that minimizes or limits a HARQ delay subject to a minimum three ms processing time by the mobile device. The control information may be bundled for transmission on the UL subframes.

Figure 14:
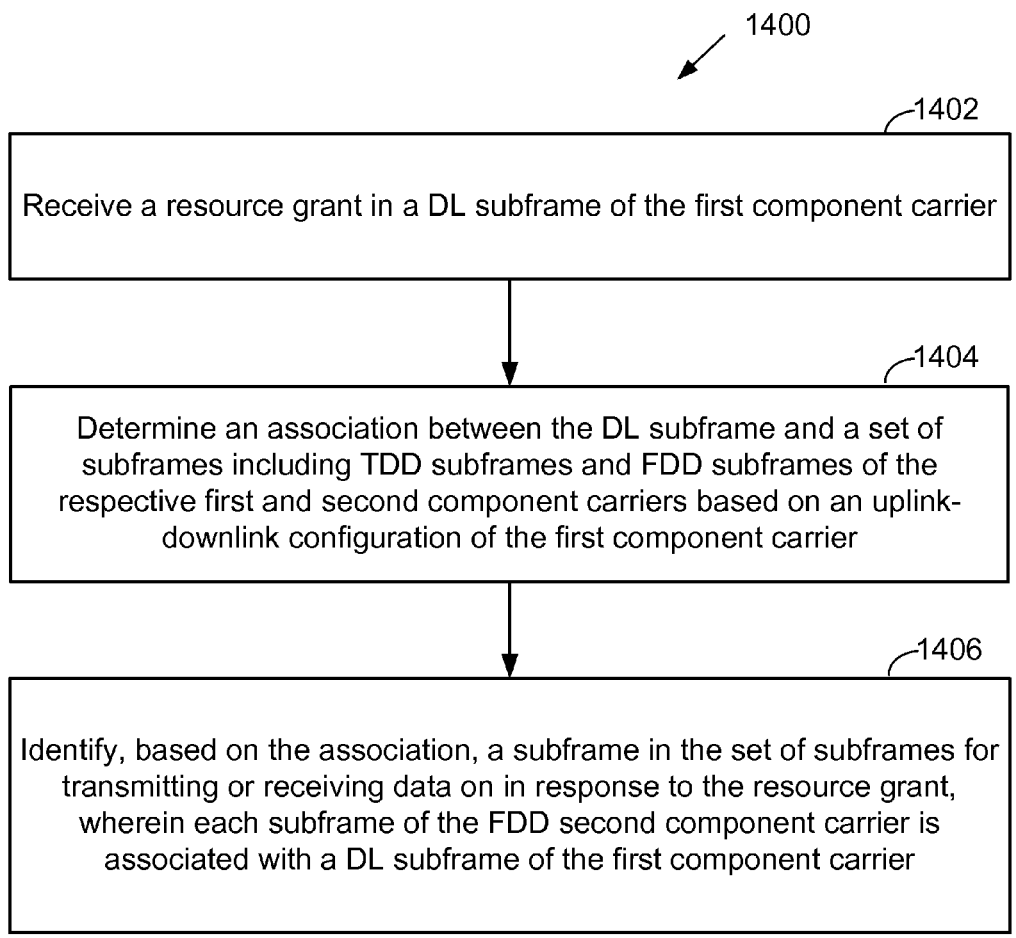
FIG. 14 shows an example of a process of a mobile device for identifying subframes of aggregated carriers for transmitting or receiving data in a wireless network.

FIG. 14 shows an example of a process 1400 for identifying subframes of aggregated carriers for transmitting or receiving data in a wireless network. Process 1400 may be performed by a mobile device (e.g., a UE), as described above, or by some other entity. The mobile device may receive a resource grant in a DL subframe of the first component carrier (block 1402). In one example, block 1402 may be performed by any combination of antennas 1752, demodulators 1754, detector 1756, processors 1758, 1780, and/or memory 1760, 1782.

In one design, the mobile device may determine an association between the DL subframe and a set of subframes including TDD subframes and FDD subframes of the respective first and second component carriers based on an uplink-downlink configuration of the first component carrier (block 1404). In one example, block 1404 may be performed by processor 1708, or processor 1708 coupled to memory 1782.

In one design, the mobile device may identify, based on the association, a subframe in the set of subframes for transmitting or receiving data on in response to the resource grant, wherein each subframe of the FDD second component carrier is associated with a DL subframe of the first component carrier (block 1406). In one example, block 1406 may be performed by processor 1708, or processor 1708 coupled to memory 1782.

Figure 15:
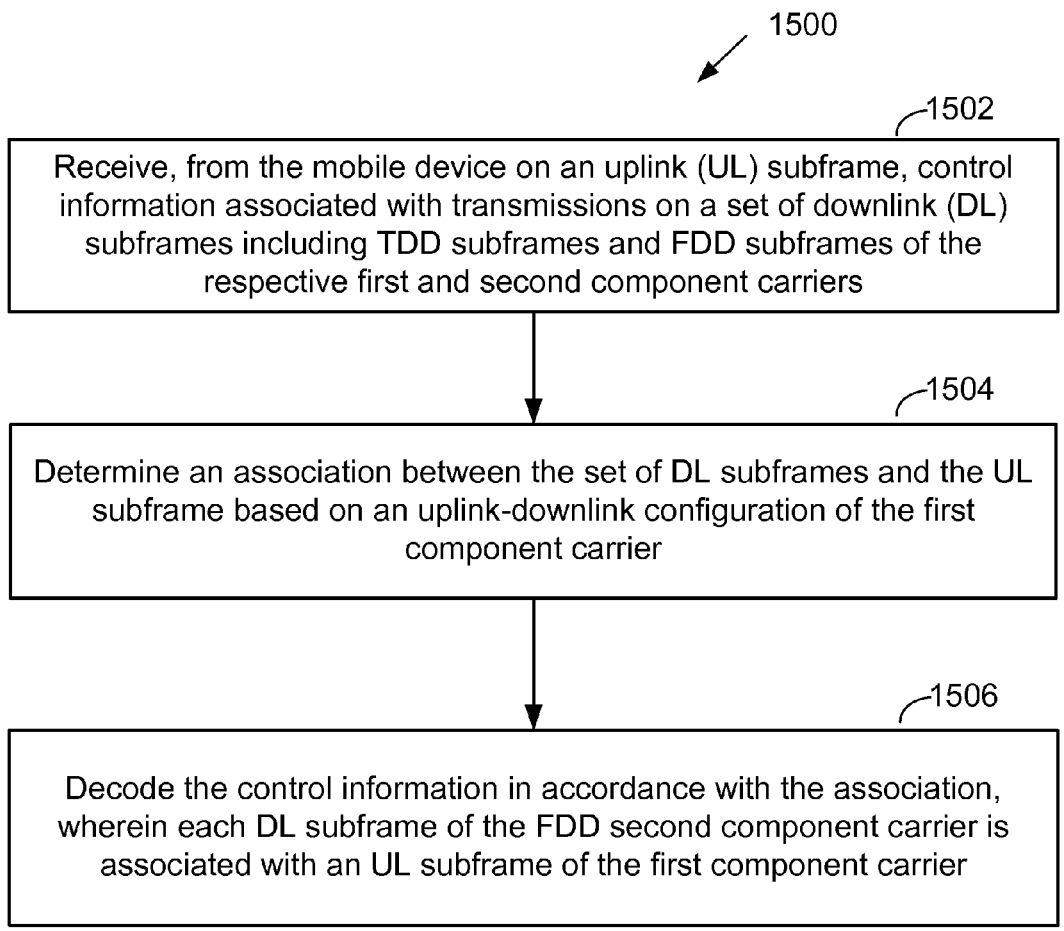
FIG. 15 shows an example of a process of an access node for processing control information receiving from a mobile device in a wireless network.

FIG. 15 shows an example of a process 1500 for decoding or utilizing control information in a wireless network. Process 1500 may be performed by an access node (e.g., a base station, an eNB, etc.), as described above, or by some other entity. The access node may receive, from a mobile device on an UL subframe, control information associated with transmissions on a set of DL subframes including TDD subframes and FDD subframes of the respective first and second component carriers (block 1502). In one example, block 1502 may be performed by any combination of antennas 1734, demodulators 1732, detector 1736, processors 1738, 1740, and/or memories 1739, 1742.

In one design, the access node may determining an association between the set of DL subframes and the UL subframe based on an uplink-downlink configuration of the first component carrier (block 1504). In one example, block 1504 may be performed by processor 1740, or processor 1740 coupled to memory 1742.

In one design, the access node may decode the control information in accordance with the association, wherein each DL subframe of the FDD second component carrier is associated with an UL subframe of the first component carrier (block 1506). In one example, block 1506 may be performed by any combination of processors 1738, 1740, and/or memories 1739, 1742.

Figure 16:
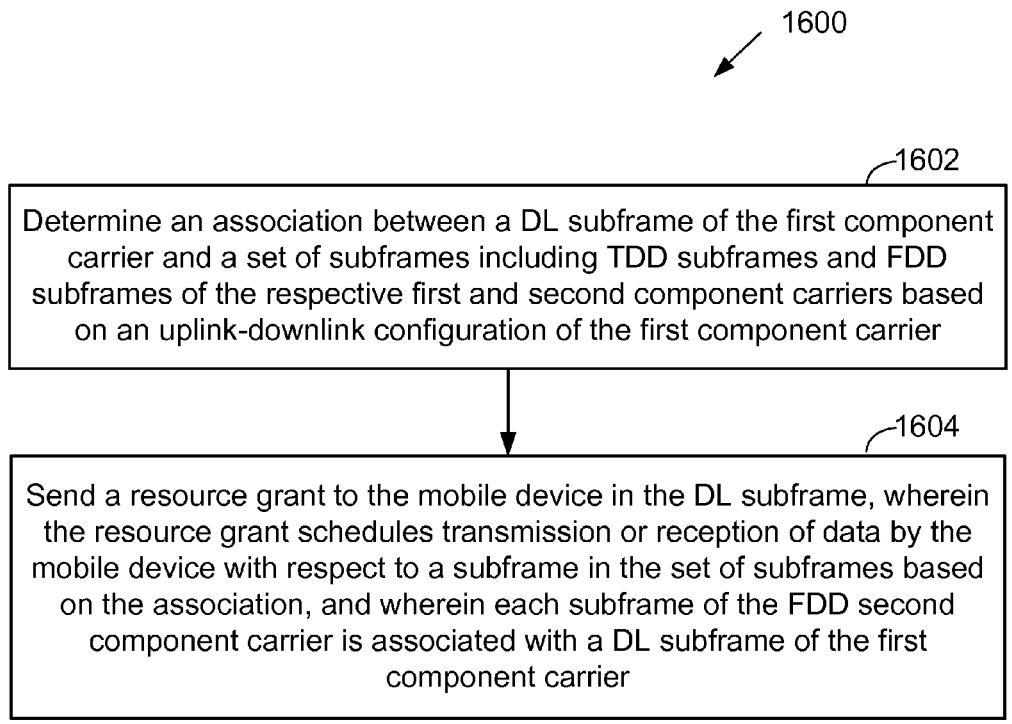
FIG. 16 shows an example of a process of an access node for sending control information in a wireless network.

FIG. 16 shows an example of a process 1600 for sending control information in a wireless network. Process 1500 may be performed by an access node (e.g., a base station, an eNB, etc.), as described above, or by some other entity. The access node may determine an association between a DL subframe of the first component carrier and a set of subframes including TDD subframes and FDD subframes of the respective first and second component carriers based on an uplink-downlink configuration of the first component carrier (block 1602). In one example, block 1602 may be performed by processor 1740 or processor 1740 coupled to memory 1742.

In one design, the access node may sending a resource grant to the mobile device in the DL subframe, wherein the resource grant schedules transmission or reception of data by the mobile device with respect to a subframe in the set of subframes based on the association, and wherein each subframe of the FDD second component carrier is associated with a DL subframe of the first component carrier (block 1604). In one example, block 1604 may be performed by any combination of antennas 1734, modulators 1732, processors 1730, 1720, 1740, and/or memories 1712, 1742.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable storage medium. Computer-readable storage media includes both computer storage media and communication media including any medium that facilitates transfer of a computer program from one place to another. A storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable storage medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable storage media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication by a mobile device configured for carrier aggregation (CA) of at least a time division duplexed (TDD) first component carrier and a frequency division duplexed (FDD) second component carrier, comprising:
   determining an association between a set of downlink (DL) subframes including TDD subframes and FDD subframes of the respective first and second component carriers and an uplink (UL) subframe of the first component carrier based on an uplink-downlink configuration of the first component carrier, wherein an availability of uplink and downlink subframes for communicating on the first component carrier is determined according to the uplink-downlink configuration of the first component carrier and is different than an availability of uplink and downlink subframes for communicating on the second component carrier;
   generating control information associated with transmissions on the set of DL subframes; and
   sending the control information on the UL subframe of the first component carrier based on the association, wherein each DL subframe of the second component carrier is associated with a corresponding UL subframe of the first component carrier.

2. The method of claim 1, wherein the association comprises a distribution of the control information associated with one or more FDD subframes such that control information for not more than a predetermined number of FDD subframe(s) is associated with the UL subframe.

3. The method of claim 2, wherein the predetermined number of FDD subframe(s) comprises one DL subframe.

4. The method of claim 1, wherein the UL subframe comprises a closest succeeding UL subframe for providing hybrid automatic repeat request (HARQ) feedback for the transmissions on the set of DL subframes subject to a minimum HARQ processing time.

5. The method of claim 1, wherein the association specifies a distribution of HARQ feedback for the FDD subframes in relation to the uplink-downlink configuration of the first component carrier.

6. The method of claim 1, wherein the control information comprises HARQ feedback bits, and sending the control information comprises bundling the HARQ feedback bits for two or more subframes in the set of DL subframes.

7. The method of claim 1, wherein the association comprises a mapping of HARQ feedback to bits of an UL control channel format.

8. A mobile device configured for carrier aggregation (CA) of at least a time division duplexed (TDD) first component carrier and a frequency division duplexed (FDD) second component carrier, the mobile device comprising:
   means for determining an association between a set of downlink (DL) subframes including TDD subframes and FDD subframes of the respective first and second component carriers and an uplink (UL) subframe of the first component carrier based on an uplink-downlink configuration of the first component carrier, wherein an availability of uplink and downlink subframes for communicating on the first component carrier is determined according to the uplink-downlink configuration of the first component carrier and is different than an availability of uplink and downlink subframes for communicating on the second component carrier;
   means for generating control information associated with transmissions on the set of DL subframes; and
   means for sending the control information on the UL subframe of the first component carrier based on the association, wherein each DL subframe of the second component carrier is associated with a corresponding UL subframe of the first component carrier.

9. The mobile device of claim 8, wherein the association comprises a distribution of the control information associated with one or more FDD subframes such that control information for not more than a predetermined number of FDD subframe(s) is associated with the UL subframe.

10. The mobile device of claim 9, wherein the predetermined number of FDD subframe(s) comprises one DL subframe.

11. The mobile device of claim 8, wherein the UL subframe comprises a closest succeeding UL subframe for providing hybrid automatic repeat request (HARQ) feedback for the transmissions on the set of DL subframes subject to a minimum HARQ processing time.

12. The mobile device of claim 8, wherein the association specifies a distribution of HARQ feedback for the FDD subframes in relation to the uplink-downlink configuration of the first component carrier.

13. The mobile device of claim 8, wherein the control information comprises HARQ feedback bits, and the means for sending the control information is further configured for bundling the HARQ feedback bits for two or more subframes in the set of DL subframes.

14. The mobile device of claim 8, wherein the association comprises a mapping of HARQ feedback to bits of an UL control channel format.

15. A mobile device configured for carrier aggregation (CA) of at least a time division duplexed (TDD) first component carrier and a frequency division duplexed (FDD) second component carrier, the mobile device comprising:
   at least one processor configured to:
      determine an association between a set of downlink (DL) subframes including TDD subframes and FDD subframes of the respective first and second component carriers and an uplink (UL) subframe of the first component carrier based on an uplink-downlink configuration of the first component carrier, wherein an availability of uplink and downlink subframes for communicating on the first component carrier is determined according to the uplink-downlink configuration of the first component carrier and is different than an availability of uplink and downlink subframes for communicating on the second component carrier, and
      generate control information associated with transmissions on the set of DL subframes;
   a transceiver configured to send the control information on the UL subframe of the first component carrier based on the association, wherein each DL subframe of the second component carrier is associated with a corresponding UL subframe of the first component carrier; and
   a memory coupled to the at least one processor for storing data.

16. The mobile device of claim 15, wherein the association comprises a distribution of the control information associated with one or more FDD subframes such that control information for not more than a predetermined number of FDD subframe(s) is associated with the UL subframe.

17. The mobile device of claim 16, wherein the predetermined number of FDD subframe(s) comprises one DL subframe.

18. The mobile device of claim 15, wherein the UL subframe comprises a closest succeeding UL subframe for providing hybrid automatic repeat request (HARQ) feedback for the transmissions on the set of DL subframes subject to a minimum HARQ processing time.

19. The mobile device of claim 15, wherein the control information comprises HARQ feedback bits, and the transceiver is further configured to send the control information comprises bundling the HARQ feedback bits for two or more subframes in the set of DL subframes.

20. The mobile device of claim 15, wherein the association comprises a mapping of HARQ feedback to bits of an UL control channel format.

21. A non-transitory computer-readable storage medium storing instructions that, when executed by a processor, cause the processor to:
   determine an association between a set of downlink (DL) subframes including TDD subframes of a first component carrier and FDD subframes of a second component carrier and an uplink (UL) subframe of the first component carrier based on an uplink-downlink configuration of the first component carrier, wherein an availability of uplink and downlink subframes for communicating on the first component carrier is determined according to the uplink-downlink configuration of the first component carrier and is different than an availability of uplink and downlink subframes for communicating on the second component carrier;
   generate control information associated with transmissions on the set of DL subframes; and
   send the control information on the UL subframe of the first component carrier based on the association, wherein each DL subframe of the second component carrier is associated with a corresponding UL subframe of the first component carrier.

22. A method of wireless communication by an access node supporting carrier aggregation (CA) of at least a time division duplexed (TDD) first component carrier and a frequency division duplexed (FDD) second component carrier for a mobile device, comprising:
   receiving, from the mobile device on an uplink (UL) subframe, control information associated with transmissions on a set of downlink (DL) subframes including TDD subframes of a first component carrier and FDD subframes of a second component carrier, wherein an availability of uplink and downlink subframes for communicating on the first component carrier is determined according to the uplink-downlink configuration of the first component carrier and is different than an availability of uplink and downlink subframes for communicating on the second component carrier;
   determining an association between the set of DL subframes and the UL subframe based on an uplink-downlink configuration of the first component carrier; and
   decoding, by the access node, the control information in accordance with the association, wherein each DL subframe of the second component carrier is associated with an UL subframe of the first component carrier.

23. The method of claim 22, wherein the association comprises a distribution of control information associated with subframes of the second component carrier such that control information for not more than a predetermined number of FDD subframe(s) is associated with the DL subframe.

24. The method of claim 22, wherein the UL subframe comprises a closest succeeding UL subframe for providing hybrid automatic repeat request (HARQ) feedback for the transmissions on the set of DL subframes subject to a minimum HARQ processing time.

25. The method of claim 22, wherein the control information comprises bundled HARQ feedback, and decoding the control information comprises decoding the HARQ feedback for determining a status of the associated one or more FDD subframes.

26. The method of claim 22, wherein the association comprises a mapping of HARQ feedback to bits of an UL control channel format.

27. An access node configured for carrier aggregation (CA) of at least a time division duplexed (TDD) first component carrier and a frequency division duplexed (FDD) second component carrier, comprising:
   means for receiving, from a mobile device on an uplink (UL) subframe, control information associated with transmissions on a set of downlink (DL) subframes including TDD subframes of a first component carrier and FDD subframes of a second component carrier, wherein an availability of uplink and downlink subframes for communicating on the first component carrier is determined according to the uplink-downlink configuration of the first component carrier and is different than an availability of uplink and downlink subframes for communicating on the second component carrier;
   means for determining an association between the set of DL subframes and the UL subframe based on an uplink-downlink configuration of the first component carrier; and
   means for decoding, by the access node, the control information in accordance with the association, wherein each DL subframe of the second component carrier is associated with an UL subframe of the first component carrier.

28. The access node of claim 27, wherein the association comprises a distribution of control information associated with subframes of the second component carrier such that control information for not more than a predetermined number of FDD subframe(s) is associated with the DL subframe.

29. The access node of claim 27, wherein the UL subframe comprises a closest succeeding UL subframe for providing hybrid automatic repeat request (HARD) feedback for the transmissions on the set of DL subframes subject to a minimum HARQ processing time.

30. The access node of claim 27, wherein the control information comprises bundled HARQ feedback and decoding the control information comprises decoding the HARQ feedback for determining a status of the associated one or more FDD subframes.

31. The access node of claim 27, wherein the association comprises a mapping of HARQ feedback to bits of an UL control channel format.

32. An access node configured for carrier aggregation (CA) of at least a time division duplexed (TDD) first component carrier and a frequency division duplexed (FDD) second component carrier for a mobile device, comprising:

a transceiver configured to receive, from the mobile device on an uplink (UL) subframe, control information associated with transmissions on a set of downlink (DL) subframes including TDD subframes of a first component carrier and FDD subframes of a second component carrier, wherein an availability of uplink and downlink subframes for communicating on the first component carrier is determined according to the uplink-downlink configuration of the first component carrier and is different than an availability of uplink and downlink subframes for communicating on the second component carrier;
at least one processor configured to:
  determine an association between the set of DL subframes and the UL subframe based on an uplink-downlink configuration of the first component carrier, and
  decode, by the access node, the control information in accordance with the association, wherein each DL subframe of the second component carrier is associated with an UL subframe of the first component carrier; and
a memory coupled to the at least one processor for storing data.

33. The access node of claim 32, wherein the association comprises a distribution of control information associated with subframes of the second component carrier such that control information for not more than a predetermined number of FDD subframe(s) is associated with the DL subframe.

34. The access node of claim 32, wherein the UL subframe comprises a closest succeeding UL subframe for providing hybrid automatic repeat request (HARQ) feedback for the transmissions on the set of DL subframes subject to a minimum HARQ processing time.

35. The access node of claim 32, wherein the control information comprises bundled HARQ feedback and decoding the control information comprises decoding the HARQ feedback for determining a status of the associated one or more FDD subframes.

36. The access node of claim 32, wherein the association comprises a mapping of HARQ feedback to bits of an UL control channel format.

37. A non-transitory computer-readable storage medium storing instructions that, when executed by a processor, cause the processor to:
  receive, from a mobile device on an uplink (UL) subframe, control information associated with transmissions on a set of downlink (DL) subframes including TDD subframes of a first component carrier and FDD subframes of a second component carrier, wherein an availability of uplink and downlink subframes for communicating on the first component carrier is determined according to the uplink-downlink configuration of the first component carrier and is different than an availability of uplink and downlink subframes for communicating on the second component carrier;
  determine an association between the set of DL subframes and the UL subframe based on an uplink-downlink configuration of the first component carrier; and
  the control information in accordance with the association, wherein each DL subframe of the second component carrier is associated with an UL subframe of the first component carrier.

* * * * *